(12) United States Patent
Tang et al.

(10) Patent No.: US 10,880,050 B2
(45) Date of Patent: Dec. 29, 2020

(54) HYBRID AUTOMATIC REPEAT REQUEST HARQ CODEBOOK GENERATION METHOD AND RELATED DEVICE

(71) Applicant: HUAWEI TECHNOLOGIES CO., LTD., Shenzhen (CN)

(72) Inventors: Hao Tang, Shanghai (CN); Zhongfeng Li, Shanghai (CN); Jinlin Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/400,702

(22) Filed: May 1, 2019

(65) Prior Publication Data

US 2019/0260515 A1 Aug. 22, 2019

Related U.S. Application Data

(63) Continuation of application No. PCT/CN2017/108077, filed on Oct. 27, 2017.

(30) Foreign Application Priority Data

Nov. 4, 2016 (CN) .......................... 2016 1 0981534

(51) Int. Cl.
*H04L 1/18* (2006.01)
*H04L 5/00* (2006.01)
(Continued)

(52) U.S. Cl.
CPC .......... *H04L 1/1819* (2013.01); *H04L 1/1854* (2013.01); *H04L 1/1896* (2013.01);
(Continued)

(58) Field of Classification Search
CPC ... H04L 1/1819; H04L 1/1854; H04L 1/1896; H04L 5/00; H04L 5/0078; H04W 72/04; H04W 72/0413; H04W 72/0453
See application file for complete search history.

(56) References Cited

U.S. PATENT DOCUMENTS 9,215,701 B2 12/2015 Koc et al.
2013/0021898 A1 1/2013 Kang et al.
(Continued)

FOREIGN PATENT DOCUMENTS

CN 103312468 A 9/2013
CN 104320226 A 1/2015
(Continued)

OTHER PUBLICATIONS

International Search Report dated Jan. 12, 2018 in corresponding International Application No. PCT/CN2017/108077.
(Continued)

*Primary Examiner* — Ronald B Abelson
(74) *Attorney, Agent, or Firm* — Leydig, Voit & Mayer, Ltd.

(57) ABSTRACT

This application provides a HARQ codebook generation method and a related device. The method includes: receiving, by a terminal, first information, where the first information is used to indicate carriers configured by the access network device for the terminal, the configured carriers include a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier; and generating, by the terminal based on HARQ timing of the configured carriers and a relationship between the transmission time unit length of the first carrier and the transmission time unit length of
(Continued)

the second carrier, a HARQ codebook transmitted on the uplink control channel of the first carrier.

16 Claims, 6 Drawing Sheets

(51) Int. Cl.
*H04W 72/04* (2009.01)
*H04L 1/16* (2006.01)

(52) U.S. Cl.
CPC .............. *H04L 5/00* (2013.01); *H04L 5/0078* (2013.01); *H04W 72/04* (2013.01); *H04W 72/0413* (2013.01); *H04W 72/0453* (2013.01); *H04L 1/1685* (2013.01); *H04L 1/1861* (2013.01)

(56) References Cited

U.S. PATENT DOCUMENTS

| | | |
|---|---|---|
| 2013/0195065 A1 | 8/2013 | Park |
| 2014/0036814 A1 | 2/2014 | Zhang et al. |
| 2015/0131494 A1 | 5/2015 | He et al. |
| 2016/0344515 A1 | 11/2016 | Aiba et al. |
| 2018/0048431 A1 | 2/2018 | Wang et al. |
| 2019/0159251 A1* | 5/2019 | Li .......................... H04W 74/08 |

FOREIGN PATENT DOCUMENTS

| | | |
|---|---|---|
| CN | 104396174 A | 3/2015 |
| CN | 104823499 A | 8/2015 |
| CN | 105850175 A | 8/2016 |
| CN | 105991246 A | 10/2016 |
| EP | 2256984 A1 | 12/2010 |
| EP | 2685650 A1 | 1/2014 |
| EP | 2693823 A2 | 2/2014 |
| WO | 2010051779 A1 | 5/2010 |

OTHER PUBLICATIONS

Chinese Office Action dated Mar. 22, 2019 in corresponding Chinese Patent Application No. 201610981534.6 (7 pages).
International Search Report dated Jan. 12, 2018 in corresponding International Patent Application No. PCT/CN2017/108077 (8 pages).
Written Opinion of the International Searching Authority dated Jan. 12, 2018 in corresponding International Patent Application No. PCT/CN2017/108077 (5 pages).
"Explicit HARQ and scheduling timing design for LTE sTTI," 3GPP TSG RAN WG1 #86bis, Lisbon, Portugal, R1-1610444 (Updated from R1-1608754), pp. 1-3, 3rd Generation Partnership Project, Valbonne, France (Oct. 10-14, 2016).
"Discussion on CA issues for shortened TTI operation," 3GPP TSG RAN WG1 #86bis, Lisbon, Portugal, R1-1608653, pp. 1-4, 3rd Generation Partnership Project, Valbonne, France (Oct. 10-14, 2016).
"Processing time reduction and related procedures for short TTI," 3GPP TSG RAN WG1 #86bis, R1-1608643, pp. 1-8, 3rd Generation Partnership Project, Valbonne, France (Oct. 10-14, 2016).

* cited by examiner

D0, D4, and D5 are downlink subframes
S1 and S6 are special subframes
U2, U3, U7, and U8 are uplink subframes

HYBRID AUTOMATIC REPEAT REQUEST HARQ CODEBOOK GENERATION METHOD AND RELATED DEVICE

CROSS-REFERENCE TO RELATED APPLICATIONS

This application is a continuation of International Application No. PCT/CN2017/108077, filed on Oct. 27, 2017, which claims priority to Chinese Patent Application No. 201610981534.6, filed on Nov. 4, 2016. The disclosures of the aforementioned applications are hereby incorporated by reference in their entireties.

TECHNICAL FIELD

This application relates to the communications field, and in particular, to a HARQ codebook generation method and a related device.

BACKGROUND

To better meet ever-increasing service type requirements, in a new access technology, for example, a 5G technology, two new service types: ultra-reliable and low latency communications (URLLC) and massive machine type communications (mMTC) are additionally introduced in addition to enhanced mobile broadband (eMBB) and a broadcast service that are already supported in Long Term Evolution (LTE). Service characteristics of the service types are obviously different. Therefore, all services have different requirements for system parameters such as a subcarrier spacing and a symbol length.

To meet requirements of different service types for a carrier parameter, in LTE-Advanced, a carrier aggregation technology is proposed in the 3rd Generation Partnership Project (3GPP). In the carrier aggregation technology, a plurality of carriers are well aggregated into a wider spectrum, and some discontinuous spectra may also be aggregated together.

However, transmission time units used by the aggregated carriers are the same, and are all 1 ms. However, in New Radio (NR), there is a case in which transmission time units used by aggregated carriers are different. When transmission time units are different, if an access network device delivers downlink data to a terminal, and the terminal sets a HARQ codebook according to setting under situation when transmission time units are the same, of a hybrid automatic repeat request (HARQ) feedback, the HARQ codebook is incorrect, and data transmission between the access network device and the terminal is affected.

SUMMARY

This application provides a HARQ codebook generation method and a related device, so that when there are carriers having different transmission time unit lengths in component carriers in carrier aggregation, a HARQ codebook can be correctly generated, and data transmission between an access network device and a terminal is not affected.

A first aspect of the present invention provides a HARQ codebook generation method, including:

receiving, by a terminal, first information sent by an access network device, where the first information is used to indicate, to the terminal, carriers configured by the access network device for the terminal, the configured carriers include a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier; and generating, by the terminal based on HARQ timing of the configured carriers and a relationship between the transmission time unit length of the first carrier and the transmission time unit length of the second carrier, a HARQ codebook transmitted on the uplink control channel of the first carrier.

When the terminal accesses the access network device, the access network device configures the carriers for the terminal. The carriers configured by the access network device include the first carrier and the second carrier, the HARQ feedback information of the first carrier and the HARQ feedback information of the second carrier are transmitted on the uplink control channel of the first carrier, and the transmission time unit length of the first carrier is not equal to the transmission time unit length of the second carrier. In addition, the terminal is notified of the configured carriers by using the first information. The terminal receives the first information sent by the access network device. The terminal generates, based on the HARQ timing of the carriers configured by the access network device and the relationship between the transmission time unit length of the first carrier and the transmission time unit length of the second carrier, the HARQ codebook transmitted on the uplink control channel of the first carrier. In the prior art, because a transmission time unit length of a first carrier is not equal to a transmission time unit length of a second carrier, a HARQ codebook generated by a terminal is incorrect. In this embodiment of the present invention, the terminal can correctly generate the HARQ codebook, and data transmission between the access network device and the terminal is not affected.

With reference to the first aspect of the present invention, in a first implementation of the first aspect of the present invention, the relationship between the transmission time unit length of the first carrier and the transmission time unit length of the second carrier is that the transmission time unit length of the first carrier is N times the transmission time unit length of the second carrier; one transmission time unit n of the first carrier is aligned with N transmission time units of the second carrier in time domain, and the N transmission time units of the second carrier include a transmission time unit m; and N is a positive integer greater than 1, and n and m are natural numbers;

the HARQ timing of the configured carriers includes HARQ timing of the transmission time unit m of the second carrier, where the HARQ timing of the transmission time unit m is used to instruct the terminal to transmit HARQ feedback information for the transmission time unit m in a $k^{th}$ transmission time unit after the transmission time unit n of the first carrier; and the generating, by the terminal based on HARQ timing of the configured carriers and a relationship between the transmission time unit length of the first carrier and the transmission time unit length of the second carrier, a HARQ codebook transmitted on the uplink control channel of the first carrier includes:

generating, by the terminal, a HARQ codebook transmitted in the $k^{th}$ transmission time unit after the transmission time unit n of the first carrier, where a size of a HARQ codebook of the second carrier that is included in the HARQ codebook is N times a time window size of the second carrier, and the time window size is a quantity of downlink transmission time units for which HARQ feedback information needs to be transmitted in one uplink transmission time unit.

In the carriers configured by the access network device, if the relationship between the transmission time unit length of the first carrier and the transmission time unit length of the second carrier is that the transmission time unit length of the first carrier is N times the transmission time unit length of the second carrier, one transmission time unit n of the first carrier is aligned with N transmission time units of the second carrier in time domain, and when the N transmission time units of the second carrier include the transmission time unit m, the HARQ timing of the configured carriers is set by default between the access network device and the terminal, or the access network device configures and sends the HARQ timing to the terminal. HARQ timing of the first carrier in the HARQ timing of the configured carriers is consistent with existing HARQ timing, and the HARQ timing of the transmission time unit m of the second carrier is used to instruct the terminal to transmit the HARQ feedback information for the transmission time unit m in the $k^{th}$ transmission time unit after the transmission time unit n of the first carrier. The terminal generates the HARQ codebook transmitted in the $k^{th}$ transmission time unit after the transmission time unit n of the first carrier. The size of the HARQ codebook of the second carrier that is included in the HARQ codebook is N times the time window size of the second carrier, and the time window size is the quantity of downlink transmission time units for which HARQ feedback information needs to be transmitted in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the first aspect of the present invention, in a second implementation of the first aspect of the present invention, the relationship between the transmission time unit length of the first carrier and the transmission time unit length of the second carrier is that the transmission time unit length of the first carrier is N times the transmission time unit length of the second carrier; and one transmission time unit n of the first carrier is aligned with N transmission time units of the second carrier in time domain, N is a positive integer greater than 1, and n is a natural number;

the HARQ timing of the configured carriers includes HARQ timing of the second carrier, where the HARQ timing of the second carrier is used to instruct the terminal to transmit HARQ feedback information in at least one of the N transmission time units of the second carrier; and the generating, by the terminal based on HARQ timing of the configured carriers and a relationship between the transmission time unit length of the first carrier and the transmission time unit length of the second carrier, a HARQ codebook transmitted on the uplink control channel of the first carrier includes:

determining, by the terminal based on the HARQ timing of the second carrier, to transmit, in the transmission time unit n of the first carrier, HARQ feedback information that needs to be transmitted in at least one of the N transmission time units; and generating, by the terminal, a HARQ codebook transmitted in the transmission time unit n of the first carrier, where a size of a HARQ codebook of the second carrier that is included in the HARQ codebook is N times a time window size of the second carrier, and the time window size is a quantity of downlink transmission time units for which HARQ feedback information needs to be transmitted in one uplink transmission time unit.

In the carriers configured by the access network device, if the relationship between the transmission time unit length of the first carrier and the transmission time unit length of the second carrier is that the transmission time unit length of the first carrier is N times the transmission time unit length of the second carrier, one transmission time unit n of the first carrier is aligned with N transmission time units of the second carrier in time domain, N is a positive integer greater than 1, and n is a natural number, the HARQ timing of the configured carriers is set by default between the access network device and the terminal, or the access network device configures and sends the HARQ timing to the terminal. HARQ timing of the first carrier in the HARQ timing of the configured carriers is consistent with existing HARQ timing, and the HARQ timing of the second carrier is used to instruct the terminal to transmit HARQ feedback information in at least one of the N transmission time units of the second carrier. The terminal determines, based on the HARQ timing of the second carrier, to transmit, in the transmission time unit n of the first carrier, the HARQ feedback information that needs to be transmitted in at least one of the N transmission time units. The terminal generates the HARQ codebook transmitted in the transmission time unit n of the first carrier. The size of the HARQ codebook of the second carrier that is included in the HARQ codebook is N times the time window size of the second carrier, and the time window size is the quantity of downlink transmission time units for which HARQ feedback information needs to be transmitted in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the first aspect of the present invention, in a third implementation of the first aspect of the present invention, the relationship between the transmission time unit length of the first carrier and the transmission time unit length of the second carrier is that the transmission time unit length of the first carrier is N times the transmission time unit length of the second carrier; one transmission time unit n of the first carrier is aligned with N transmission time units of the second carrier in time domain, and the N transmission time units of the second carrier include M uplink transmission time units; and N is a positive integer greater than 1, M is a positive integer, n is a natural number, and M≤N;

the HARQ timing of the configured carriers includes HARQ timing of the second carrier, where the HARQ timing of the second carrier is used to instruct the terminal to transmit HARQ feedback information in at least one of the M uplink transmission time units of the second carrier; and the generating, by the terminal based on HARQ timing of the configured carriers and a relationship between the transmission time unit length of the first carrier and the transmission time unit length of the second carrier, a HARQ codebook transmitted on the uplink control channel of the first carrier includes:

determining, by the terminal based on the HARQ timing of the second carrier, to transmit, in the transmission time unit n of the first carrier, HARQ feedback information that needs to be transmitted in at least one of the M transmission time units; and generating, by the terminal, a HARQ codebook transmitted in the transmission time unit n of the first carrier, where a size of a HARQ codebook of the second carrier that is included in the HARQ codebook is M times a time window size of the second carrier, and the time window size is a quantity of downlink transmission time units for which HARQ feedback information needs to be transmitted in one uplink transmission time unit.

In the carriers configured by the access network device, if the relationship between the transmission time unit length of the first carrier and the transmission time unit length of the second carrier is that the transmission time unit length of the first carrier is N times the transmission time unit length of the second carrier; one transmission time unit n of the first carrier is aligned with N transmission time units of the second carrier in time domain, and the N transmission time units of the second carrier include M uplink transmission time units; and N is a positive integer greater than 1, M is a positive integer, n is a natural number, and M≤N, the HARQ timing of the configured carriers is set by default between the access network device and the terminal, or the access network device configures and sends the HARQ timing to the terminal. HARQ timing of the first carrier in the HARQ timing of the configured carriers is consistent with existing HARQ timing, and the HARQ timing of the second carrier is used to instruct the terminal to transmit the HARQ feedback information in at least one of the M uplink transmission time units of the second carrier, and the terminal determines, based on the HARQ timing of the second carrier, to transmit, in the transmission time unit n of the first carrier, the HARQ feedback information that needs to be transmitted in at least one of the M transmission time units. The terminal generates the HARQ codebook transmitted in the transmission time unit n of the first carrier. The size of the HARQ codebook of the second carrier that is included in the HARQ codebook is M times the time window size of the second carrier, and the time window size is the quantity of downlink transmission time units for which HARQ feedback information needs to be transmitted in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the first aspect of the present invention, in a fourth implementation of the first aspect of the present invention, the relationship between the transmission time unit length of the first carrier and the transmission time unit length of the second carrier is that the transmission time unit length of the second carrier is N times the transmission time unit length of the first carrier; N transmission time units of the first carrier are aligned with one transmission time unit n of the second carrier in time domain, and the last transmission time unit of the N transmission time units of the first carrier in time domain is a transmission time unit m; and N is a positive integer greater than 1, and n and m are natural numbers;

the HARQ timing of the configured carriers includes HARQ timing of the transmission time unit n of the second carrier, where the HARQ timing of the transmission time unit n is used to instruct the terminal to transmit HARQ feedback information for the transmission time unit n in a $k^{th}$ transmission time unit after the transmission time unit m of the first carrier; and the generating, by the terminal based on HARQ timing of the configured carriers and a relationship between the transmission time unit length of the first carrier and the transmission time unit length of the second carrier, a HARQ codebook transmitted on the uplink control channel of the first carrier includes:

generating, by the terminal, a HARQ codebook for feeding back HARQ feedback information in the $k^{th}$ transmission time unit after the transmission time unit m of the first carrier, where a size of a HARQ codebook of the second carrier that is included in the HARQ codebook is 1/N times a time window size of the second carrier or is equal to a time window size of the first carrier, and the time window size is a quantity of downlink transmission time units for which HARQ feedback information needs to be transmitted in one uplink transmission time unit.

In the carriers configured by the access network device, if the relationship between the transmission time unit length of the first carrier and the transmission time unit length of the second carrier is that the transmission time unit length of the second carrier is N times the transmission time unit length of the first carrier; N transmission time units of the first carrier are aligned with one transmission time unit n of the second carrier in time domain, and the last transmission time unit of the N transmission time units of the first carrier in time domain is a transmission time unit m; and N is a positive integer greater than 1, and n and m are natural numbers, the HARQ timing of the configured carriers is set by default between the access network device and the terminal, or the access network device configures and sends the HARQ timing to the terminal. HARQ timing of the first carrier in the HARQ timing of the configured carriers is consistent with existing HARQ timing, and the HARQ timing of the second carrier is used to instruct the terminal to transmit the HARQ feedback information for the transmission time unit n in the kth transmission time unit after the transmission time unit m of the first carrier. The terminal generates the HARQ codebook transmitted in the transmission time unit n of the first carrier. The size of the HARQ codebook of the second carrier that is included in the HARQ codebook is 1/N times the time window size of the second carrier or is equal to the time window size of the first carrier, and the time window size is the quantity of downlink transmission time units for which HARQ feedback information needs to be transmitted in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the first aspect of the present invention, in a fifth implementation of the first aspect of the present invention, the relationship between the transmission time unit length of the first carrier and the transmission time unit length of the second carrier is that the transmission time unit length of the second carrier is N times the transmission time unit length of the first carrier; N transmission time units of the first carrier are aligned with one transmission time unit n of the second carrier in time domain, and the N transmission time units of the first carrier include M uplink transmission time units; and N is a positive integer greater than 1, n and m are natural numbers, and M≤N;

the HARQ timing of the configured carriers includes HARQ timing of the second carrier, used to instruct the terminal to transmit HARQ feedback information in the transmission time unit n of the second carrier; and the generating, by the terminal based on HARQ timing of the configured carriers and a relationship between the transmission time unit length of the first carrier and the transmission time unit length of the second carrier, a HARQ codebook transmitted on the uplink control channel of the first carrier includes:

determining, by the terminal based on the HARQ timing of the second carrier, to transmit, in one of the M transmission time units of the first carrier, HARQ feedback information that needs to be transmitted in the transmission time unit n of the second carrier; and generating, by the terminal, a HARQ codebook in one of the M transmission time units of the first carrier, where a size of a HARQ codebook of the second carrier that is included in the HARQ codebook is 1/M times a time window size of the second carrier, and the time window size is a quantity of downlink transmission time units for which feedbacks need to be provided in one uplink transmission time unit.

In the carriers configured by the access network device, if the relationship between the transmission time unit length of the first carrier and the transmission time unit length of the second carrier is that the transmission time unit length of the second carrier is N times the transmission time unit length of the first carrier; N transmission time units of the first carrier are aligned with one transmission time unit n of the second carrier in time domain, and the N transmission time units of the first carrier include M uplink transmission time units; and N is a positive integer greater than 1, n and m are natural numbers, and M≤N, the HARQ timing of the configured carriers is set by default between the access network device and the terminal, or the access network device configures and sends the HARQ timing to the terminal. HARQ timing of the first carrier in the HARQ timing of the configured carriers is consistent with existing HARQ timing, and the HARQ timing of the second carrier is used to instruct the terminal to transmit the HARQ feedback information in the transmission time unit n of the second carrier. The terminal determines, based on the HARQ timing of the second carrier, to transmit, in one of the M transmission time units of the first carrier, the HARQ feedback information that needs to be transmitted in the transmission time unit n of the second carrier. The terminal generates the HARQ codebook in one of the M transmission time units of the first carrier. The size of the HARQ codebook of the second carrier that is included in the HARQ codebook is 1/M times the time window size of the second carrier, and the time window size is the quantity of downlink transmission time units for which feedbacks need to be provided in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the first aspect of the present invention, the first implementation of the first aspect, the second implementation of the first aspect, the third implementation of the first aspect, the fourth implementation of the first aspect, or the fifth implementation of the first aspect, in a sixth implementation of the first aspect of the present invention, the first carrier is a primary carrier, and the second carrier is a secondary carrier.

In an existing 4G network, carriers configured by an access network device for a terminal according to a carrier aggregation technology include one primary carrier and a plurality of secondary carriers, and subframe lengths of the primary carrier and the secondary carrier are the same. However, in this solution, if the first carrier is a primary carrier, the second carrier is a secondary carrier, and the transmission time unit length of the first carrier is not equal to the transmission time unit length of the second carrier.

A second aspect of the present invention provides a HARQ codebook generation method, including:

assigning, by an access network device, configured carriers to a terminal;

generating, by the access network device, first information based on the assignment, where the first information is used to indicate, to the terminal, the carriers configured by the access network device for the terminal, the configured carriers include a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier; and sending, by the access network device, the first information to the terminal.

When the terminal accesses the access network device, the access network device assigns the configured carriers to the terminal. The carriers configured by the access network device include the first carrier and the second carrier, the HARQ feedback information of the first carrier and the HARQ feedback information of the second carrier are transmitted on the uplink control channel of the first carrier, and the transmission time unit length of the first carrier is not equal to the transmission time unit length of the second carrier. In addition, the first information is generated based on the assignment, and the first information is sent to the terminal, so that the terminal can generate, based on the first information, a HARQ codebook transmitted on the uplink control channel of the first carrier. In the prior art, because a transmission time unit length of a first carrier is not equal to a transmission time unit length of a second carrier, a HARQ codebook generated by a terminal is incorrect. In this embodiment of the present invention, the terminal can correctly generate the HARQ codebook, and data transmission between the access network device and the terminal is not affected.

With reference to the second aspect of the present invention, in a first implementation of the second aspect of the present invention, that the transmission time unit length of the first carrier is not equal to the transmission time unit length of the second carrier includes that the carrier information includes that the transmission time unit length of the first carrier is N times the transmission time unit length of the second carrier; one transmission time unit n of the first carrier is aligned with N transmission time units of the second carrier in time domain; and N is a positive integer greater than 1, and n is a natural number.

With reference to the first implementation of the second aspect of the present invention, in a second implementation of the second aspect of the present invention, the N transmission time units of the second carrier include M uplink transmission time units, and M≤N.

With reference to the second aspect of the present invention, in a third implementation of the second aspect of the present invention, that the transmission time unit length of the first carrier is not equal to the transmission time unit length of the second carrier includes that the carrier information includes that the transmission time unit length of the second carrier is N times the transmission time unit length of the first carrier; N transmission time units of the first carrier are aligned with one transmission time unit n of the second carrier in time domain; and N is a positive integer greater than 1, and n is a natural number.

With reference to the third implementation of the second aspect of the present invention, in a fourth implementation of the second aspect of the present invention, the N transmission time units of the first carrier include M uplink transmission time units, and M≤N.

With reference to the second aspect of the present invention, the first implementation of the second aspect, the second implementation of the second aspect, the third implementation of the first aspect, or the fourth implementation of the second aspect, in a fifth implementation of the second aspect of the present invention, the first message is further used to indicate a relationship between the transmission time unit length of the first carrier and the transmission time unit length of the second carrier.

In the foregoing embodiment, carrier information of the carriers configured by the access network device for the terminal is described in detail. Because the carrier information is inconsistent with carrier information in the prior art, the access network device needs to send the first information to the terminal based on the carrier information, so that the terminal can correctly generate the HARQ codebook.

With reference to the first implementation of the second aspect of the present invention, in a sixth implementation of the second aspect of the present invention, the N transmission time units of the second carrier include a transmission time unit m, and m is a natural number; and the method further includes:

configuring, by the access network device, HARQ timing of the transmission time unit m of the second carrier for the terminal, where the HARQ timing of the transmission time unit m is used to instruct the terminal to transmit HARQ feedback information for the transmission time unit m in a $k^{th}$ transmission time unit after the transmission time unit n of the first carrier; and the first information is further used to indicate the HARQ timing of the transmission time unit m of the second carrier.

In addition to agreeing with the terminal about the HARQ timing, the access network device may configure the HARQ timing. Compared with the prior art, HARQ timing of the first carrier may be originally set. Because the transmission time unit length of the first carrier is different from the transmission time unit length of the second carrier, HARQ timing of the second carrier needs to be reconfigured. When the N transmission time units of the second carrier include the transmission time unit m, the HARQ timing of the transmission time unit m of the second carrier may be used to instruct the terminal to transmit the HARQ feedback information for the transmission time unit m in the $k^{th}$ transmission time unit after the transmission time unit n of the first carrier, or may be used to indicate the HARQ timing of the transmission time unit m of the second carrier.

With reference to the third implementation of the second aspect of the present invention, in a seventh implementation of the second aspect of the present invention, the last transmission time unit in the N transmission time units of the first carrier in time domain is a transmission time unit m, and m is a natural number; and the method further includes:

configuring, by the access network device, HARQ timing of the transmission time unit n of the second carrier for the terminal, where the HARQ timing of the transmission time unit n is used to instruct the terminal to transmit HARQ feedback information for the transmission time unit n in a $k^{th}$ transmission time unit after the transmission time unit m of the first carrier; and the first information is further used to indicate the HARQ timing of the transmission time unit n of the second carrier.

In addition to agreeing with the terminal about the HARQ timing, the access network device may configure the HARQ timing. Compared with the prior art, HARQ timing of the first carrier may be originally set. Because the transmission time unit length of the first carrier is different from the transmission time unit length of the second carrier, HARQ timing of the second carrier needs to be reconfigured. When the last transmission time unit in the N transmission time units of the first carrier in time domain is the transmission time unit m, the HARQ timing of the transmission time unit m of the second carrier may be used to instruct the terminal to transmit the HARQ feedback information for the transmission time unit m in the $k^{th}$ transmission time unit after the transmission time unit n of the first carrier, or may be used to indicate the HARQ timing of the transmission time unit m of the second carrier.

A third aspect of the present invention provides a terminal, including:

a receiving module, configured to receive first information sent by an access network device, where the first information is used to indicate, to the terminal, carriers configured by the access network device for the terminal, the configured carriers include a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier; and a processing module, configured to generate, based on HARQ timing of the configured carriers and a relationship between the transmission time unit length of the first carrier and the transmission time unit length of the second carrier, a HARQ codebook transmitted on the uplink control channel of the first carrier.

When the terminal accesses the access network device, the access network device configures the carriers for the terminal. The carriers configured by the access network device include the first carrier and the second carrier, the HARQ feedback information of the first carrier and the HARQ feedback information of the second carrier are transmitted on the uplink control channel of the first carrier, and the transmission time unit length of the first carrier is not equal to the transmission time unit length of the second carrier. In addition, the terminal is notified of the configured carriers by using the first information. The receiving module receives the first information sent by the access network device. The processing module generates, based on the HARQ timing of the carriers configured by the access network device and the relationship between the transmission time unit length of the first carrier and the transmission time unit length of the second carrier, the HARQ codebook transmitted on the uplink control channel of the first carrier. In the prior art, because a transmission time unit length of a first carrier is not equal to a transmission time unit length of a second carrier, a HARQ codebook generated by a terminal is incorrect. In this embodiment of the present invention, the terminal can correctly generate the HARQ codebook, and data transmission between the access network device and the terminal is not affected.

With reference to the third aspect of the present invention, in a first implementation of the third aspect of the present invention, the relationship between the transmission time unit length of the first carrier and the transmission time unit length of the second carrier is that the transmission time unit length of the first carrier is N times the transmission time unit length of the second carrier; one transmission time unit n of the first carrier is aligned with N transmission time units of the second carrier in time domain, and the N transmission time units of the second carrier include a transmission time unit m; and N is a positive integer greater than 1, and n and m are natural numbers;

the HARQ timing of the configured carriers includes HARQ timing of the transmission time unit m of the second carrier, where the HARQ timing of the transmission time unit m is used to instruct the terminal to transmit HARQ feedback information for the transmission time unit m in a $k^{th}$ transmission time unit after the transmission time unit n of the first carrier;

the processing module is specifically configured to determine, based on the HARQ timing of the second carrier, to transmit, in the transmission time unit n of the first carrier, HARQ feedback information that needs to be transmitted in at least one of the N transmission time units; and the processing module is further configured to generate a HARQ codebook transmitted in the $k^{th}$ transmission time unit after the transmission time unit n of the first carrier, where a size of a HARQ codebook of the second carrier that is included in the HARQ codebook is N times a time window size of the second carrier, and the time window size is a quantity of downlink transmission time units for which HARQ feedback information needs to be transmitted in one uplink transmission time unit.

In the carriers configured by the access network device, if the relationship between the transmission time unit length of the first carrier and the transmission time unit length of the second carrier is that the transmission time unit length of the first carrier is N times the transmission time unit length of the second carrier, one transmission time unit n of the first carrier is aligned with N transmission time units of the second carrier in time domain, and when the N transmission time units of the second carrier include the transmission time unit m, the HARQ timing of the configured carriers is set by default between the access network device and the terminal, or the access network device configures and sends the HARQ timing to the terminal. HARQ timing of the first carrier in the HARQ timing of the configured carriers is consistent with existing HARQ timing, and the HARQ timing of the transmission time unit m of the second carrier is used to instruct the terminal to transmit the HARQ feedback information for the transmission time unit m in the $k^{th}$ transmission time unit after the transmission time unit n of the first carrier. The processing module generates the HARQ codebook transmitted in the $k^{th}$ transmission time unit after the transmission time unit n of the first carrier. The size of the HARQ codebook of the second carrier that is included in the HARQ codebook is N times the time window size of the second carrier, and the time window size is the quantity of downlink transmission time units for which HARQ feedback information needs to be transmitted in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the third aspect of the present invention, in a second implementation of the third aspect of the present invention, the relationship between the transmission time unit length of the first carrier and the transmission time unit length of the second carrier is that the transmission time unit length of the first carrier is N times the transmission time unit length of the second carrier; and one transmission time unit n of the first carrier is aligned with N transmission time units of the second carrier in time domain, N is a positive integer greater than 1, and n is a natural number;

the HARQ timing of the configured carriers includes HARQ timing of the second carrier, where the HARQ timing of the second carrier is used to instruct the terminal to transmit HARQ feedback information in at least one of the N transmission time units of the second carrier;

the processing module is specifically configured to determine, based on the HARQ timing of the second carrier, to transmit, in the transmission time unit n of the first carrier, HARQ feedback information that needs to be transmitted in at least one of the M transmission time units; and the processing module is further configured to generate a HARQ codebook transmitted in the transmission time unit n of the first carrier, where a size of a HARQ codebook of the second carrier that is included in the HARQ codebook is N times a time window size of the second carrier, and the time window size is a quantity of downlink transmission time units for which HARQ feedback information needs to be transmitted in one uplink transmission time unit.

The processing module generates the HARQ codebook transmitted in the transmission time unit n of the first carrier, where the size of the HARQ codebook of the second carrier that is included in the HARQ codebook is N times the time window size of the second carrier, and the time window size is the quantity of downlink transmission time units for which HARQ feedback information needs to be transmitted in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the third aspect of the present invention, in a third implementation of the third aspect of the present invention, the relationship between the transmission time unit length of the first carrier and the transmission time unit length of the second carrier is that the transmission time unit length of the first carrier is N times the transmission time unit length of the second carrier; one transmission time unit n of the first carrier is aligned with N transmission time units of the second carrier in time domain, and the N transmission time units of the second carrier include M uplink transmission time units; and N is a positive integer greater than 1, M is a positive integer, n is a natural number, and M≤N;

the HARQ timing of the configured carriers includes HARQ timing of the second carrier, where the HARQ timing of the second carrier is used to instruct the terminal to transmit HARQ feedback information in at least one of the M uplink transmission time units of the second carrier;

the processing module is specifically configured to determine, based on the HARQ timing of the second carrier, to transmit, in the transmission time unit n of the first carrier, HARQ feedback information that needs to be transmitted in at least one of the M transmission time units; and the processing module is further configured to generate a HARQ codebook transmitted in the transmission time unit n of the first carrier, where a size of a HARQ codebook of the second carrier that is included in the HARQ codebook is M times a time window size of the second carrier, and the time window size is a quantity of downlink transmission time units for which HARQ feedback information needs to be transmitted in one uplink transmission time unit.

The processing module generates the HARQ codebook transmitted in the transmission time unit n of the first carrier, where the size of the HARQ codebook of the second carrier that is included in the HARQ codebook is M times the time window size of the second carrier, and the time window size is the quantity of downlink transmission time units for which HARQ feedback information needs to be transmitted in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the third aspect of the present invention, in a fourth implementation of the third aspect of the present invention, the relationship between the transmission time unit length of the first carrier and the transmission time unit length of the second carrier is that the transmission time unit length of the second carrier is N times the transmission time unit length of the first carrier; N transmission time units of the first carrier are aligned with one transmission time unit n of the second carrier in time domain, and the last transmission time unit of the N transmission time units of the first carrier in time domain is a transmission time unit m; and N is a positive integer greater than 1, and n and m are natural numbers;

the HARQ timing of the configured carriers includes HARQ timing of the transmission time unit n of the second carrier, where the HARQ timing of the transmission time unit n is used to instruct the terminal to transmit HARQ feedback information for the transmission time unit n in a $k^{th}$ transmission time unit after the transmission time unit m of the first carrier; and the processing module is specifically configured to generate a HARQ codebook for feeding back HARQ feedback information in the $k^{th}$ transmission time unit after the transmission time unit of the first carrier, where a size of a HARQ codebook of the second carrier that is included in the HARQ codebook is 1/N times a time window size of the second carrier or is equal to a time window size of the first carrier, and the time window size is a quantity of downlink transmission time units for which HARQ feedback information needs to be transmitted in one uplink transmission time unit.

The processing module generates the HARQ codebook transmitted in the transmission time unit n of the first carrier, where the size of the HARQ codebook of the second carrier that is included in the HARQ codebook is 1/N times the time window size of the second carrier or is equal to the time window size of the first carrier, and the time window size is the quantity of downlink transmission time units for which HARQ feedback information needs to be transmitted in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the third aspect of the present invention, in a fifth implementation of the third aspect of the present invention, the relationship between the transmission time unit length of the first carrier and the transmission time unit length of the second carrier is that the transmission time unit length of the second carrier is N times the transmission time unit length of the first carrier; N transmission time units of the first carrier are aligned with one transmission time unit n of the second carrier in time domain, and the N transmission time units of the first carrier include M uplink transmission time units; and N is a positive integer greater than 1, n and m are natural numbers, and M≤N;

the HARQ timing of the configured carriers includes HARQ timing of the second carrier, where the HARQ timing of the second carrier is used to instruct the terminal to transmit HARQ feedback information in the transmission time unit n of the second carrier;

the processing module is specifically configured to determine, based on the HARQ timing of the second carrier, to transmit, in one of the M transmission time units of the first carrier, HARQ feedback information that needs to be transmitted in the transmission time unit n of the second carrier; and the processing module is further configured to generate a HARQ codebook in one of the M transmission time units of the first carrier, where a size of a HARQ codebook of the second carrier that is included in the HARQ codebook is 1/M times a time window size of the second carrier, and the time window size is a quantity of downlink transmission time units for which feedbacks need to be provided in one uplink transmission time unit.

The processing module generates the HARQ codebook in one of the M transmission time units of the first carrier, where the size of the HARQ codebook of the second carrier that is included in the HARQ codebook is 1/M times the time window size of the second carrier, and the time window size is the quantity of downlink transmission time units for which feedbacks need to be provided in one uplink transmission time unit. A codebook size of the HARQ codebook obtained in this solution is a sum of a size of the HARQ codebook of the first carrier and the size of the HARQ codebook of the second carrier, and therefore the HARQ codebook is correctly obtained, thereby effectively resolving a problem that a HARQ codebook cannot be correctly obtained in the prior art.

With reference to the third aspect of the present invention, the first implementation of the third aspect, the second implementation of the third aspect, the third implementation of the third aspect, the fourth implementation of the third aspect, or the fifth implementation of the third aspect, in a sixth implementation of the third aspect of the present invention, the first carrier is a primary carrier, and the second carrier is a secondary carrier.

In an existing 4G network, carriers configured by an access network device for a terminal according to a carrier aggregation technology include one primary carrier and a plurality of secondary carriers, and subframe lengths of the primary carrier and the secondary carrier are the same. However, in this solution, if the first carrier is a primary carrier, the second carrier is a secondary carrier, and the transmission time unit length of the first carrier is not equal to the transmission time unit length of the second carrier.

A fourth aspect of the present invention provides an access network device, including:

a configuration module, configured to assign configured carriers to a terminal;

a generation module, configured to generate first information based on the assignment, where the first information is used to indicate, to the terminal, the carriers configured by the access network device for the terminal, the configured carriers include a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier; and a sending module, configured to send the first information to the terminal.

When the terminal accesses the access network device, the configuration module assigns the configured carriers to the terminal. The carriers configured by the configuration module include the first carrier and the second carrier, the HARQ feedback information of the first carrier and the HARQ feedback information of the second carrier are transmitted on the uplink control channel of the first carrier, and the transmission time unit length of the first carrier is not equal to the transmission time unit length of the second carrier. In addition, the generation module generates the first information based on the assignment, and the sending module sends the first information to the terminal, so that the terminal can generate, based on the first information, a HARQ codebook transmitted on the uplink control channel of the first carrier. In the prior art, because a transmission time unit length of a first carrier is not equal to a transmission time unit length of a second carrier, a HARQ codebook generated by a terminal is incorrect. In this embodiment of the present invention, the terminal can correctly generate the HARQ codebook, and data transmission between the access network device and the terminal is not affected.

With reference to the fourth aspect of the present invention, in a first implementation of the fourth aspect of the present invention, that the transmission time unit length of the first carrier is not equal to the transmission time unit length of the second carrier includes that the carrier information includes that the transmission time unit length of the first carrier is N times the transmission time unit length of the second carrier; one transmission time unit n of the first carrier is aligned with N transmission time units of the second carrier in time domain; and N is a positive integer greater than 1, and n is a natural number.

With reference to the first implementation of the fourth aspect of the present invention, in a second implementation of the fourth aspect of the present invention, the N transmission time units of the second carrier include M uplink transmission time units, and M≤N.

With reference to the fourth aspect of the present invention, in a third implementation of the fourth aspect of the present invention, that the transmission time unit length of the first carrier is not equal to the transmission time unit length of the second carrier includes that the carrier information includes that the transmission time unit length of the second carrier is N times the transmission time unit length of the first carrier; N transmission time units of the first carrier are aligned with one transmission time unit n of the second carrier in time domain; and N is a positive integer greater than 1, and n is a natural number.

With reference to the third implementation of the fourth aspect of the present invention, in a fourth implementation of the fourth aspect of the present invention, the N transmission time units of the first carrier include M uplink transmission time units, and M≤N.

With reference to the fourth aspect of the present invention, the first implementation of the fourth aspect, the second implementation of the fourth aspect, the third implementation of the fourth aspect, or the fourth implementation of the fourth aspect, in a fifth implementation of the fourth aspect of the present invention, the first message is further used to indicate a relationship between the transmission time unit length of the first carrier and the transmission time unit length of the second carrier.

In the foregoing embodiment, carrier information of the carriers configured by the access network device for the terminal is described in detail. Because the carrier information is inconsistent with carrier information in the prior art, the access network device needs to send the first information to the terminal based on the carrier information, so that the terminal can correctly generate the HARQ codebook.

With reference to the first implementation of the fourth aspect of the present invention, in a sixth implementation of the fourth aspect of the present invention, the N transmission time units of the second carrier include a transmission time unit m, and m is a natural number;

the configuration module is further configured to configure HARQ timing of the transmission time unit m of the second carrier for the terminal, where the HARQ timing of the transmission time unit m is used to instruct the terminal to transmit HARQ feedback information for the transmission time unit m in a $k^{th}$ transmission time unit after the transmission time unit n of the first carrier; and the first information is further used to indicate the HARQ timing of the transmission time unit m of the second carrier.

With reference to the third implementation of the fourth aspect of the present invention, in a fourth implementation of the fourth aspect of the present invention, the last transmission time unit in the N transmission time units of the first carrier in time domain is a transmission time unit m, and m is a natural number;

the configuration module is further configured to configure HARQ timing of the transmission time unit n of the second carrier for the terminal, where the HARQ timing of the transmission time unit n is used to instruct the terminal to transmit HARQ feedback information for the transmission time unit n in a $k^{th}$ transmission time unit after the transmission time unit m of the first carrier; and the first information is further used to indicate the HARQ timing of the transmission time unit n of the second carrier.

In addition to agreeing with the terminal about the HARQ timing, the access network device may configure the HARQ timing by using the configuration module. Compared with the prior art, HARQ timing of the first carrier may be originally set. Because the transmission time unit length of the first carrier is different from the transmission time unit length of the second carrier, HARQ timing of the second carrier needs to be reconfigured. When the last transmission time unit in the N transmission time units of the first carrier in time domain is the transmission time unit m, the HARQ timing of the transmission time unit n of the second carrier may be used to instruct the terminal to transmit the HARQ feedback information for the transmission time unit m in the $k^{th}$ transmission time unit after the transmission time unit n of the first carrier, or may be used to indicate the HARQ timing of the transmission time unit n of the second carrier.

A fifth aspect of the present invention provides a method for determining a downlink assignment index DAI value, where the method is applied to a multi-carrier communications system, the plurality of carriers have at least two transmission time unit lengths, and the method includes:

determining, by a access network device, a value of a total DAI and a value of a cumulative DAI based on a shortest transmission time unit length in the at least two transmission time unit lengths; and sending, by the access network device, the value of the total DAI and the value of the cumulative DAI to a terminal.

With reference to the fifth aspect of the present invention, in a first implementation of the fifth aspect of the present invention, a longest transmission time unit length of the plurality of carriers is N times the shortest transmission time unit length, that is, N shortest transmission time units are aligned with one longest transmission time unit in time domain; and the determining, by a access network device, a value of a total DAI and a value of a cumulative DAI based on a shortest transmission time unit length in the at least two transmission time unit lengths includes:

on a first carrier in the plurality of carriers, if a header of a first transmission time unit is aligned with a header of one of the N shortest transmission time units in time domain, and the first carrier is scheduled within duration of the first transmission time unit, counting the first carrier into the total DAI and the cumulative DAI.

A sixth aspect of the present invention provides a HARQ codebook generation method, where the method is applied to a multi-carrier communications system, the plurality of carriers have at least two transmission time unit lengths, and the method includes:

receiving, by a terminal, a value of a total DAI and a value of a cumulative DAI that are sent by an access network device; and determining, by the terminal, a HARQ codebook based on the value of the total DAI and the value of the cumulative DAI.

When the terminal accesses the access network device, the access network device configures scheduled carriers for the terminal. The scheduled carriers configured by the access network device include a plurality of carriers, and the plurality of carriers include carriers with at least two transmission time unit lengths. The access network device obtains a minimum transmission time unit length in the at least two transmission time unit lengths, determines a value of a total downlink assignment index (DAI) and a value of a cumulative DAI based on the minimum transmission time unit length, and sends the value of the total DAI and the value of the cumulative DAI to the terminal. In the prior art, because a transmission time unit length of a first carrier is not equal to a transmission time unit length of a second carrier, a HARQ codebook generated by a terminal is incorrect. In this embodiment of the present invention, the terminal can obtain the correct HARQ codebook based on the value of the total DAI and the value of the cumulative DAI.

BRIEF DESCRIPTION OF DRAWINGS

To describe the technical solutions in the embodiments of the present invention more clearly, the following briefly describes the accompanying drawings required for describing the embodiments or the prior art.

DESCRIPTION OF EMBODIMENTS

This application provides a HARQ codebook generation method and a related device, so that when there are carriers having different transmission time unit lengths in component carriers in carrier aggregation, a HARQ codebook can be correctly generated, and data transmission between an access network device and a terminal is not affected.

The following clearly describes the technical solutions in this application with reference to the accompanying drawings in this application. Apparently, the described embodiments are merely some but not all of the embodiments of the present invention.

First, a system architecture or a scenario to which the present invention is applied is briefly described.

Figure 1:
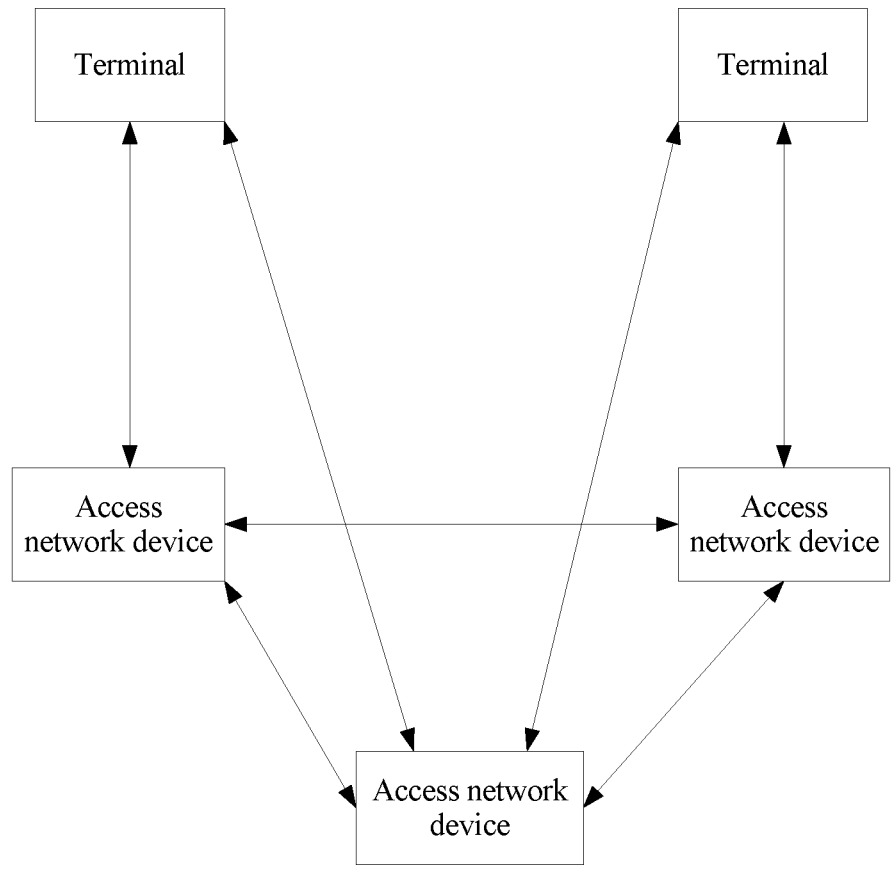
FIG. 1 is a schematic diagram of an application scenario or an architecture according to this application.

The present invention may be applied to but is not limited to an LTE system and an evolved system of the LTE system, or may be applied to a 5G technology. A system architecture is shown in FIG. 1, and data may be transmitted between access network devices and between an access network device and a terminal. When the terminal wants to access a network, the terminal may send an access request to the access network device, and the access network device assigns configured carriers to the terminal, so that the terminal can transmit data with the access network device. To meet requirements of different service types for carrier parameters, in LTE-Advanced, a carrier aggregation technology is proposed in the 3GPP. In the carrier aggregation technology, a plurality of carriers are well aggregated into a wider spectrum, and some discontinuous spectra may also be aggregated together. Transmission time units used by existing aggregated carriers are the same, and are all 1 ms. An existing HARQ codebook may be a HARQ codebook determined based on a quantity of configured carriers or a HARQ codebook determined based on a quantity of scheduled carriers. The configured carrier is a carrier that is configured by the access network device for the terminal when the terminal accesses the access network device and that can be used by the terminal, and a status of each carrier may be an active state or an inactive state. An active-state carrier is a carrier in an active state, and the terminal may use the carrier to transmit data. The scheduled carrier is a carrier that is actually used by the terminal to transmit data.

Figure 2:
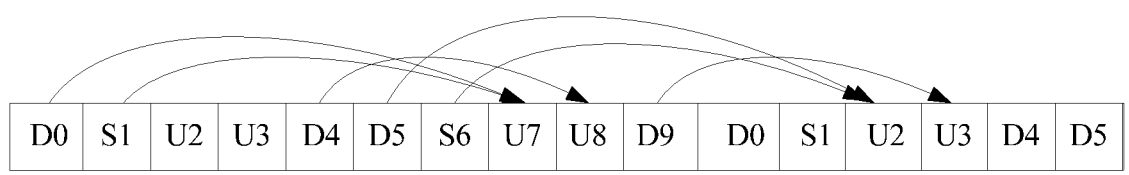
FIG. 2 is a schematic diagram of HARQ timing of an existing PCell according to this application.

In LTE-Advanced, configured carriers may be divided into one or two cell groups. One carrier, for example, a primary carrier (PCell) in each cell group may be used for transmitting a physical uplink control channel (PUCCH). The PCell needs to jointly feed back HARQ information of another carrier in the cell group. For example, the access network device configures five carriers for the terminal, where the carriers are numbered from 0 to 4, carrier 0 is a PCell, and the other four carriers are secondary carriers (SCell). All the five carriers are time division duplex (TDD) carriers, and their configurations are the same. In an uplink subframe of the PCell, a HARQ codebook to be fed back needs to be determined. As shown in FIG. 2, D0, D4, and D5 are downlink subframes, S1 and S6 are special subframes, U2, U3, U7, and U8 are uplink subframes. A time window for which a feedback needs to be provided in subframe 7 (U7) includes subframe 0 (D0) and subframe 1 (S1), and the terminal correctly receives data only in subframe 0 of the PCell, and does not correctly receive data on another secondary carrier. Then, the HARQ codebook that is fed back is 1000000000, where 10 in the HARQ codebook is HARQ feedback information in the PCell, and the HARQ feedback information indicates a status of receiving data carried in subframe 0 and subframe 1 by the terminal, where 1 indicates that the terminal correctly receives the data, and 0 indicates that the terminal does not correctly receive the data. The last eight bits in the HARQ codebook are 0 and mean HARQ feedback information corresponding to subframe 7 in the four SCells. It can be learned that a codebook size of the HARQ codebook is 10 bits.

However, in the LTE or 5G technology in the present invention, transmission time unit lengths of a first carrier (namely, a PCell in the prior art) and a second carrier (namely, a SCell in the prior art) in aggregated carriers are different. A transmission time unit may be a subframe in the prior art, or may be a slot or the like. Because the transmission time unit length of the first carrier is not equal to the transmission time unit length of the second carrier, the size of the HARQ codebook obtained in the foregoing manner is incorrect. Therefore, a HARQ codebook generation manner needs to be reset.

The following describes several terms in this application: HARQ feedback information indicates a status of receiving, by a terminal, data carried in a transmission time unit. The receiving status may be correct reception or incorrect reception. A time window indicates a set of transmission time units for which feedbacks need to be provided. For example, data receiving statuses in two transmission time units need to be fed back in one transmission time unit, and one transport block (TB) is used for data transmission between the access network device and the terminal. In this case, a time window size of the transmission time unit is 2 bits. HARQ timing indicates that a terminal feeds back, in an transmission time unit after a transmission time unit u, a data receiving status in the transmission time unit u. A HARQ codebook indicates a data receiving status of a terminal when an access network device delivers data to the terminal. The access network device may learn of the data receiving status of the terminal based on the HARQ codebook, so as to adjust a channel, transmit power, a coding scheme, or the like used between the access network device and the terminal, so that a condition of data transmission between the access network device and the terminal can meet a communications standard.

The terminal may generate the HARQ codebook by comprehensively using the time window, the HARQ feedback information, or the HARQ timing.

Figure 3:
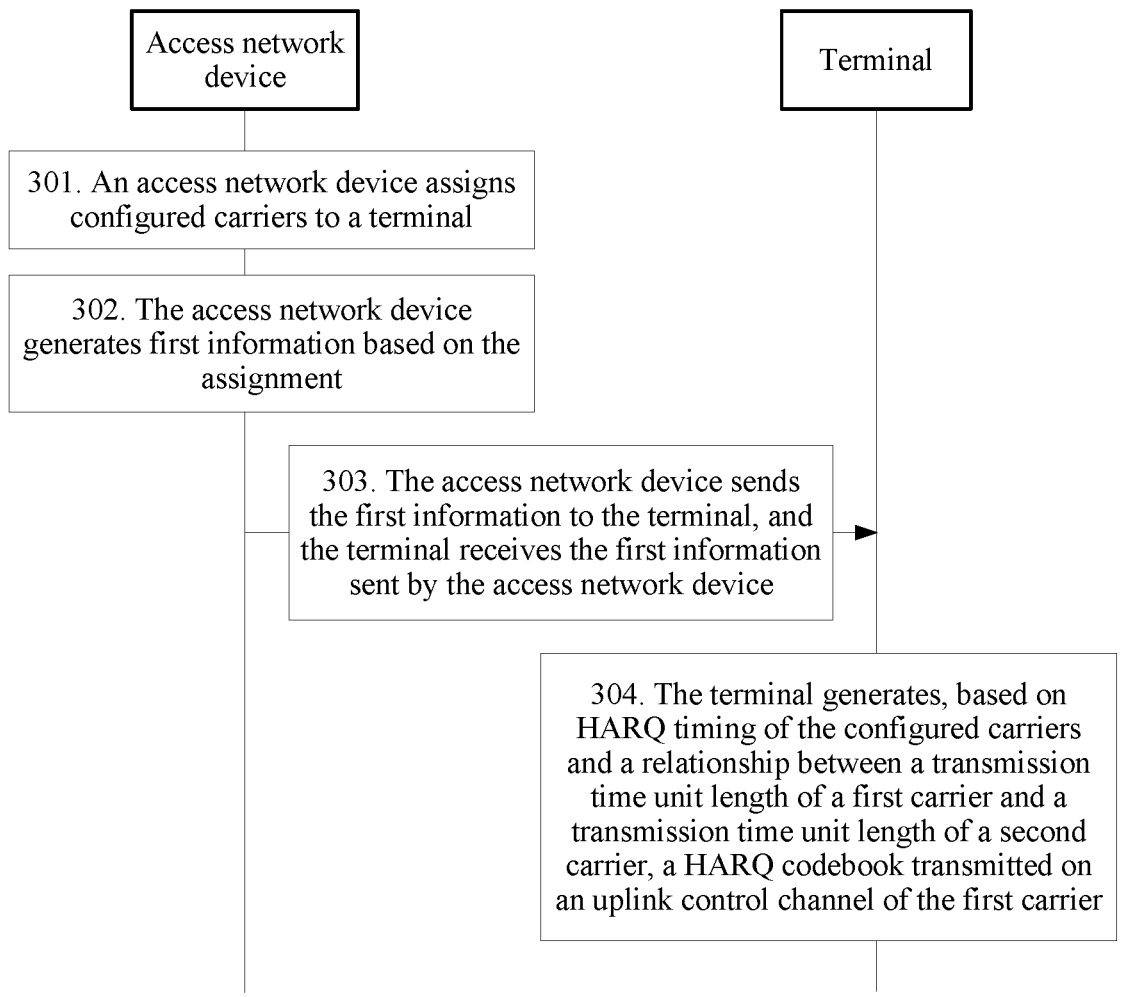
FIG. 3 is a schematic signaling flowchart of an embodiment of a HARQ codebook generation method according to this application.

The following describes a HARQ codebook generation method by using interaction between an access network device and a terminal. Referring to FIG. 3, an embodiment of the present invention provides a HARQ codebook generation method, including the following steps:

301. An access network device assigns configured carriers to a terminal.

In this embodiment, when the terminal accesses the access network device, the access network device needs to assign, to the terminal, carriers that can be used by the terminal, namely, assign the configured carriers to the terminal. The configured carriers include a first carrier and a second carrier, HARQ feedback information of the first carrier and HARQ feedback information of the second carrier are fed back on an uplink control channel of the first carrier, that is, the first carrier is equivalent to a PCell in the prior art, and the second carrier is equivalent to a SCell in the prior art. A transmission time unit length of the first carrier is not equal to a transmission time unit length of the second carrier.

That the transmission time unit length of the first carrier is not equal to the transmission time unit length of the second carrier may be caused because the first carrier and the second carrier are corresponding to different parameter sets (which may also be referred to as numerologies), or may be caused because the first carrier and the second carrier have different subcarrier spacings.

302. The access network device generates first information based on the assignment.

In this embodiment, the access network device generates the first information based on the assignment status of the configured carriers. The first information may be included in a message sent to the terminal. The message may be specifically a system information block (SIB) of a system message. There are up to ten types of SIBs currently. Each type of SIB has a different function. For example, SIB2 is used for cell update or cell handover. The first information may be included in an existing specified SIB, or a new SIB may be generated to include the first information. The first information is used to indicate, to the terminal, the carriers configured by the access network device for the terminal. The configured carriers include the first carrier and the second carrier. The HARQ feedback information of the first carrier and the HARQ feedback information of the second carrier are transmitted on the uplink control channel of the first carrier. The transmission time unit length of the first carrier is not equal to the transmission time unit length of the second carrier. It should be noted that if HARQ timing of the configured carriers is set by the access network device in real time, the HARQ timing of the configured carriers may also be indicated by using the first information, or may be indicated to the terminal by using different second information included in a message different from a message in which the first information is included. If the HARQ timing of the configured carriers is pre-agreed on between the access network device and the terminal, the HARQ timing does not need to be included in the first information.

303. The access network device sends the first information to the terminal, and the terminal receives the first information sent by the access network device.

In this embodiment, to enable data transmission between the terminal and the access network device, the access network device needs to send the first information to the terminal. During specific sending of the first information, the first information may alternatively be included in a message, and the terminal receives the message sent by the access network device, and obtains the first information from the message.

304. The terminal generates, based on HARQ timing of the configured carriers and a relationship between a transmission time unit length of a first carrier and a transmission time unit length of a second carrier, a HARQ codebook transmitted on an uplink control channel of the first carrier.

In this embodiment, the terminal may obtain, from the received first information or from different third information that is included in a message different from a message in which the first information is included, the relationship between the transmission time unit length of the first carrier and the transmission time unit length of the second carrier. If the HARQ timing of the configured carriers is set by the access network device in real time, the HARQ timing of the configured carriers may be obtained based on the first information, or the HARQ timing of the configured carriers may be learned of based on a pre-agreement between the access network device and the terminal. The HARQ feedback information of the first carrier and the HARQ feedback information of the second carrier may be determined based on the HARQ timing of the configured carriers and the relationship between the transmission time unit length of the first carrier and the transmission time unit length of the second carrier, and the HARQ codebook transmitted on the uplink control channel of the first carrier is generated based on the HARQ feedback information of the first carrier and the HARQ feedback information of the second carrier.

In this embodiment of the present invention, the terminal generates, based on the HARQ timing of the carriers configured by the access network device and the relationship between the transmission time unit length of the first carrier and the transmission time unit length of the second carrier, the HARQ codebook transmitted on the uplink control channel of the first carrier. The transmission time unit length of the first carrier is not equal to the transmission time unit length of the second carrier. If an existing HARQ codebook generation manner is still used, a HARQ codebook generated by the terminal is incorrect. In this embodiment of the present invention, the terminal can correctly generate a HARQ codebook, and data transmission between the access network device and the terminal is not affected.

It is only limited in the foregoing embodiment that the transmission time unit length of the first carrier is not equal to the transmission time unit length of the second carrier. Specifically, a different relationship between the transmission time unit length of the first carrier and the transmission time unit length of the second carrier may affect HARQ codebook generation. The following specifically describes, by using embodiments, HARQ codebook generation when there are different relationships between the transmission time unit length of the first carrier and the transmission time unit length of the second carrier.

Optionally, in some embodiments of the present invention, the relationship between the transmission time unit length of the first carrier and the transmission time unit length of the second carrier is that the transmission time unit length of the first carrier is N times the transmission time unit length of the second carrier. One transmission time unit n of the first carrier is aligned with N transmission time units of the second carrier in time domain, and the N transmission time units of the second carrier include a transmission time unit m. N is a positive integer greater than 1, and n and m are natural numbers.

The HARQ timing of the configured carriers includes HARQ timing of the transmission time unit m of the second carrier, where the HARQ timing of the transmission time unit m is used to instruct the terminal to transmit HARQ feedback information for the transmission time unit m in a $k^{th}$ transmission time unit after the transmission time unit n of the first carrier.

That the terminal generates, based on HARQ timing of the configured carriers and a relationship between a transmission time unit length of a first carrier and a transmission time unit length of a second carrier, a HARQ codebook transmitted on an uplink control channel of the first carrier includes the following:

The terminal generates a HARQ codebook transmitted in the $k^{th}$ transmission time unit after the transmission time unit n of the first carrier, where a size of a HARQ codebook of the second carrier that is included in the HARQ codebook is N times a time window size of the second carrier, and the time window size is a quantity of downlink transmission time units for which HARQ feedback information needs to be transmitted in one uplink transmission time unit.

Figure 4:
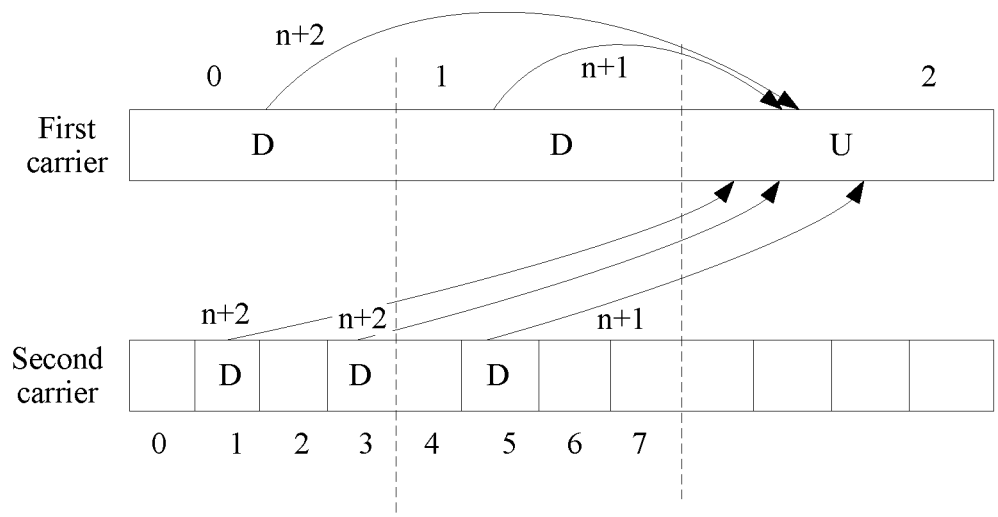
FIG. 4 is a schematic diagram of a type of HARQ timing according to this application.

In this embodiment of the present invention, specifically, as shown in FIG. 4, the transmission time unit length of the first carrier is four times the transmission time unit length of the second carrier. One transmission time unit of the first carrier is aligned with four transmission time units of the second carrier in time domain. Four transmission time units of the second carrier that are corresponding to a transmission time unit 0 of the first carrier include downlink transmission time units 1 and 3 of the second carrier, and four transmission time units of the second carrier that are corresponding to a transmission time unit 1 of the first carrier include a downlink transmission time unit 5 of the second carrier. Setting of HARQ timing of the first carrier is consistent with that in the prior art. In FIG. 4, HARQ feedback information for the transmission time unit 0 of the first carrier and HARQ feedback information for the transmission time unit 1 of the first carrier are transmitted in a transmission time unit 2 of the first carrier. HARQ timing of the transmission time units 1 and 3 of the second carrier is used to instruct the terminal to transmit HARQ feedback information for the transmission time units 1 and 3 of the second carrier in the transmission time unit 2 of the first carrier. HARQ timing of the transmission time unit 5 of the second carrier is used to instruct the terminal to transmit HARQ feedback information for the transmission time unit 5 of the second carrier in the transmission time unit 2 of the first carrier. The terminal generates a HARQ codebook in the transmission time unit 2 of the first carrier, where a size of a HARQ codebook of the first carrier that is included in the HARQ codebook is 2 bits, and a time window size of the first carrier is the same as that of the HARQ codebook and is 2 bits. Because four transmission time units of the second carrier are aligned with one transmission time unit of the first carrier, a time window size of the second carrier is also 2 bits, but a size of a HARQ codebook of the second carrier is four times the time window size of the second carrier, namely, 8 bits. It is assumed that data in the transmission time unit 0 of the first carrier is correctly received, but data in the transmission time unit 1 of the first carrier is incorrectly received. In this case, the HARQ feedback information of the first carrier is 10. It is assumed that data in the transmission time units 1, 3, and 5 of the second carrier is correctly received, the HARQ feedback information of the second carrier is 01010100. The HARQ feedback information of the first carrier and the HARQ feedback information of the second carrier are concatenated to obtain a HARQ codebook 1001010100. It should be noted that in the HARQ codebook obtained in the concatenation manner in this solution, the HARQ feedback information of the first carrier is at the front, for example, "10", and the HARQ feedback information of the second carrier is after the HARQ feedback information of the first carrier, for example, "01010100". In actual implementation, in the concatenation manner, the HARQ feedback information of the second carrier may be at the front, the HARQ feedback information of the first carrier is after the HARQ feedback information of the second carrier, and the HARQ codebook is "0101010010". In addition, a specific concatenation manner may also be in another form, and this is not limited.

It should be noted that, in FIG. 4, only the second carrier whose transmission time unit length is ¼ of the transmission time unit length of the first carrier is selected. In specific implementation, there may be carriers of other transmission time unit lengths. HARQ feedback information of these carriers with other transmission unit lengths also needs to be transmitted on the first carrier. The terminal only needs to generate, in a same processing manner as that used for the second carrier, a codebook that needs to be fed back on the first carrier, and then concatenate the codebook with another codebook that also needs to be fed back on the first carrier.

For ease of description, the time window size of the second carrier may be denoted as W, and the size of the HARQ codebook of the second carrier is denoted as W multiplied by N (W*N).

In some specific implementations of this embodiment, to avoid excessive heavy feedback overheads, the access network device may further configure a maximum value U, that is, the size of the HARQ codebook of the second carrier is a smaller value in U and W*N, and is denoted as min(W*N, U). When W*N>U, the size of the HARQ codebook of the second carrier is U. Optionally, if it is detected that a quantity of scheduled physical downlink shared channels (PDSCH) exceeds U, only HARQ feedback information of first detected U PDSCHs is fed back, or only HARQ feedback information of a PDSCH scheduled by using downlink control information (DCI) that carries a DAI value less than U is fed back. Optionally, one U value is configured for each carrier, or all carriers share one U value.

In addition, in a time window, some transmission time units of the second carrier may be uplink transmission time units configured by using higher layer signaling, for example, Radio Resource Control (RRC) signaling or a system information block (SIB). Downlink data does not need to be transmitted in these transmission time units, and therefore the terminal does not need to feed back information for these transmission time units. The size of the HARQ codebook of the second carrier may be configured as W*N−X, where X is a quantity of uplink transmission time units that is in one time window of the second carrier and that is configured by using higher layer signaling.

In the foregoing embodiment, a monitoring period of a physical downlink control channel (PDCCH) (used for scheduling DCI of a PDSCH or a resource set in which the PDSCH is located) is one transmission time unit. In some other specific implementations of this embodiment, the monitoring period of the PDCCH may be configured as T, T≥1, and T is an integer. Based on the foregoing embodiment, in this case, the size of the HARQ codebook of the second carrier is min(W*N/T, U). If W*N cannot be divided by T exactly, W*N/T may be rounded up, or W*N/T may be rounded down, that is, the size of the HARQ codebook of the second carrier is min([W*N/T], U) or min([W*N/T], U). Whether to perform rounding up or down is determined by a start monitoring transmission time unit (or offset) of the PDCCH.

Persons skilled in the art may combine the foregoing described embodiments, that is, comprehensively consider one or more of the foregoing various factors to generate a codebook to be fed back, and this is not limited herein.

In the foregoing embodiment, a feedback window is defined and/or configured at a granularity of the transmission time unit length of the first carrier. For example, the feedback window defined or configured at the granularity of the transmission time unit length of the first carrier is {n+1, n+2}, and this means that feedbacks for the time unit 0 (corresponding to n+2) and the time unit 1 (corresponding to n+1) of the first carrier in FIG. 4 may be provided in the time unit 2. Therefore, the codebook size of the first carrier is 2.

Feedbacks for the time unit 0 (corresponding to n+2), the time unit 1 (corresponding to n+2), the time unit 2 (corresponding to n+2), the time unit 3 (corresponding to n+2), a time unit 4 (corresponding to n+1), the time unit 5 (corresponding to n+1), a time unit 6 (corresponding to n+1), and a time unit 7 (corresponding to n+1) of the second carrier in FIG. 4 may be provided in the time unit 2 of the first carrier. Therefore, the codebook size of the first carrier is 8. For another example, as shown in FIG. 4, for the first carrier, the PDSCH is transmitted in the transmission time unit n=0 of the first carrier, and HARQ feedback information for the transmission time unit n may be fed back in a transmission time unit n+2 of the first carrier (that is, the transmission time unit 2 of the first carrier). For the second carrier, the PDSCH is transmitted in a transmission time unit m=1 of the second carrier, which is corresponding to the transmission time unit n=0 of the first carrier. HARQ feedback information for the transmission time unit m may be fed back in the transmission time unit n+2 of the first carrier (namely, the transmission time unit 2 of the first carrier). A time unit granularity is the transmission time unit of the first carrier, and therefore the size of the HARQ codebook of the second carrier is determined based on W*N.

In addition, the time window may be further defined or configured at a granularity of the transmission time unit length of the second carrier (a time window of each carrier is defined and/or configured at a granularity of a transmission time unit length of the carrier). In this way, a feedback window of the second carrier that is defined or configured at the granularity of the transmission time unit length of the second carrier is {n+1, n+2}, and this means that feedbacks for the time unit 6 (corresponding to n+1) and the time unit 7 (corresponding to n+1) of the second carrier in FIG. 4 may be provided in the time unit 2 of the first carrier. Therefore, the codebook size of the first carrier is 2. In this case, the size of the HARQ codebook of the second carrier is W. Similar to the foregoing embodiment, if it is considered that the configured maximum value U is additionally introduced, the size of the HARQ codebook of the second carrier is min(W, U); or if the PDCCH monitoring period is additionally considered, the size of the HARQ codebook of the second carrier is min(W/T, U), min([W/T], U), or min([W/T], U).

Optionally, in some embodiments of the present invention, the relationship between the transmission time unit length of the first carrier and the transmission time unit length of the second carrier is that the transmission time unit length of the first carrier is N times the transmission time unit length of the second carrier. One transmission time unit n of the first carrier is aligned with N time units of the second carrier in time domain, N is a positive integer greater than 1, and n is a natural number.

The HARQ timing of the configured carriers includes HARQ timing of the second carrier, where the HARQ timing of the second carrier is used to instruct the terminal to transmit HARQ feedback information in at least one of the N transmission time units of the second carrier.

That the terminal generates, based on HARQ timing of the configured carriers and a relationship between a transmission time unit length of a first carrier and a transmission time unit length of a second carrier, a HARQ codebook transmitted on an uplink control channel of the first carrier includes the following:

The terminal determines, based on the HARQ timing of the second carrier, to transmit, in the transmission time unit n of the first carrier, HARQ feedback information that needs to be transmitted in at least one of the N transmission time units; and the terminal generates a HARQ codebook transmitted in the transmission time unit n of the first carrier, where a size of a HARQ codebook of the second carrier that is included in the HARQ codebook is N times a time window size of the second carrier, and the time window size is a quantity of downlink transmission time units for which HARQ feedback information needs to be transmitted in one uplink transmission time unit.

Figure 5:
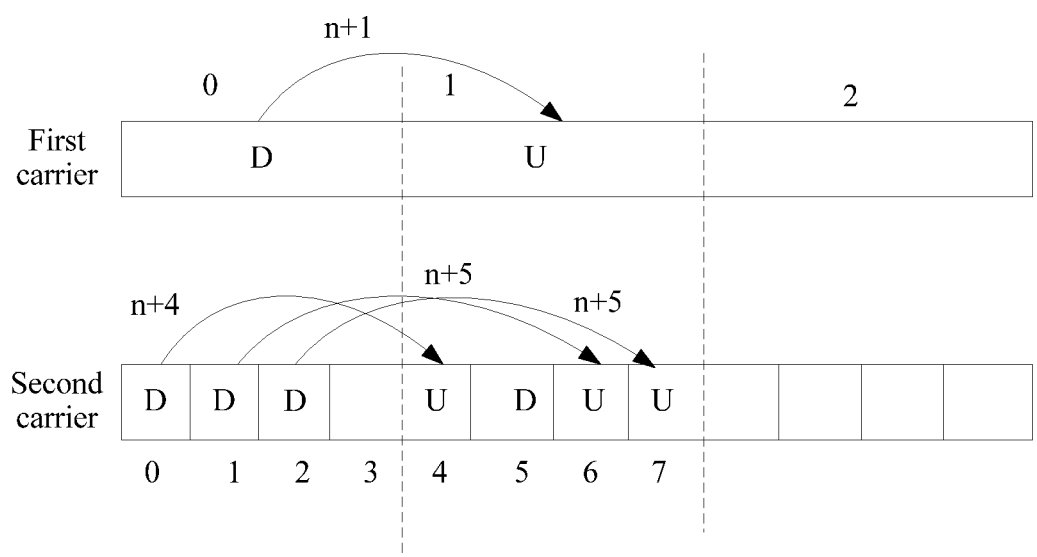
FIG. 5 is a schematic diagram of another type of HARQ timing according to this application.

In this embodiment of the present invention, as shown in FIG. 5, the transmission time unit length of the first carrier is four times the transmission time unit length of the second carrier. One transmission time unit of the first carrier is aligned with four transmission time units of the second carrier in time domain. Four transmission time units of the second carrier that are corresponding to a transmission time unit 0 of the first carrier include downlink transmission time units 0, 1, and 2 of the second carrier. Setting of HARQ timing of the first carrier is consistent with that in the prior art. In FIG. 5, HARQ feedback information for the transmission time unit 0 of the first carrier is transmitted in a transmission time unit 1 of the first carrier, and HARQ timing of the transmission time unit 0 of the second carrier is used to instruct the terminal to transmit HARQ feedback information for the transmission time unit 0 in a transmission time unit 4 of the second carrier. In addition, the terminal makes HARQ feedback information for the transmission time unit 4 correspond to the transmission time unit 1 of the first carrier. HARQ timing of the transmission time unit 1 of the second carrier is used to instruct the terminal to transmit HARQ feedback information for the transmission time unit 1 in a transmission time unit 6 of the second carrier. In addition, the terminal makes HARQ feedback information for the transmission time unit 6 correspond to the transmission time unit 1 of the first carrier. HARQ timing of the transmission time unit 2 of the second carrier is used to instruct the terminal to transmit HARQ feedback information for the transmission time unit 2 in a transmission time unit 7 of the second carrier. In addition, the terminal makes HARQ feedback information for the transmission time unit 7 correspond to the transmission time unit 1 of the first carrier. The terminal generates a HARQ codebook of the transmission time unit 1 of the first carrier, where both time window sizes of the first carrier and the second carrier are 1 bit. A size of a HARQ codebook of the first carrier that is included in the HARQ codebook is 1 bit, and a size of a HARQ codebook of the second carrier is four times the time window size of the second carrier. Assuming that data in the transmission time unit 0 of the first carrier is correctly received, the HARQ feedback information of the first carrier is 1. Assuming that data in the transmission time units 0 and 1 of the second carrier is correctly received, and data in the transmission time unit 2 is incorrectly received, the HARQ feedback information of the second carrier is 1100. The HARQ feedback information of the first carrier and the HARQ feedback information of the second carrier are concatenated to obtain a HARQ codebook 11100 of the transmission time unit 1 of the first carrier.

In the embodiment shown in FIG. 5, the size of the HARQ codebook of the second carrier is N times the time window size of the second carrier, and another size of the HARQ codebook of the second carrier is a time window size of M uplink transmission time units of the second carrier. Details are as follows:

Optionally, in some embodiments of the present invention, the relationship between the transmission time unit length of the first carrier and the transmission time unit length of the second carrier is that the transmission time unit length of the first carrier is N times the transmission time unit length of the second carrier. One transmission time unit n of the first carrier is aligned with N transmission time units of the second carrier in time domain, and the N transmission time units of the second carrier include M uplink transmission time units. N is a positive integer greater than 1, M is a positive integer, n is a natural number, and M≤N.

The HARQ timing of the configured carriers includes HARQ timing of the second carrier, used to instruct the terminal to transmit HARQ feedback information in at least one of the M uplink transmission time units of the second carrier.

That the terminal generates, based on HARQ timing of the configured carriers and a relationship between a transmission time unit length of a first carrier and a transmission time unit length of a second carrier, a HARQ codebook transmitted on an uplink control channel of the first carrier includes the following:

The terminal generates a HARQ codebook transmitted in the transmission time unit n of the first carrier, where a size of a HARQ codebook of the second carrier that is included in the HARQ codebook is M times a time window size of the second carrier, and the time window size is a quantity of downlink transmission time units for which HARQ feedback information needs to be transmitted in one uplink transmission time unit.

In this embodiment of the present invention, based on assigned configured carriers in FIG. 5, both time window sizes of the first carrier and the second carrier are 1 bit, and a size of a HARQ codebook of the first carrier that is included in the HARQ codebook is 1 bit. Because transmission time units 4 to 7 of the second carrier include three uplink transmission time units (transmission time units 4, 6, and 7), the size of the HARQ codebook of the second carrier is three times the time window size of the second carrier. Assuming that data in the transmission time unit 0 of the first carrier is correctly received, the HARQ feedback information of the first carrier is 1. Assuming that data in the transmission time units 0 and 1 of the second carrier is correctly received, and data in the transmission time unit 2 is incorrectly received, the HARQ feedback information of the second carrier is 110. The HARQ feedback information of the first carrier and the HARQ feedback information of the second carrier are concatenated to obtain a HARQ codebook 1110 of the transmission time unit 1 of the first carrier.

In the foregoing embodiment, the transmission time unit length of the first carrier is N times the transmission time unit length of the second carrier. The following specifically describes a case in which the transmission time unit length of the second carrier is N times the transmission time unit length of the first carrier.

Optionally, in some embodiments of the present invention, the relationship between the transmission time unit length of the first carrier and the transmission time unit length of the second carrier is that the transmission time unit length of the second carrier is N times the transmission time unit length of the first carrier. N transmission time units of the first carrier are aligned with one transmission time unit n of the second carrier in time domain, and the last transmission time unit of the N transmission time units of the first carrier in time domain is a transmission time unit m. N is a positive integer greater than 1, and n and m are natural numbers.

The HARQ timing of the configured carriers includes HARQ timing of the transmission time unit n of the second carrier, where the HARQ timing of the transmission time unit n is used to instruct the terminal to transmit HARQ feedback information for the transmission time unit n in a $k^{th}$ transmission time unit after the transmission time unit m of the first carrier.

That the terminal generates, based on HARQ timing of the configured carriers and a relationship between a transmission time unit length of a first carrier and a transmission time unit length of a second carrier, a HARQ codebook transmitted on an uplink control channel of the first carrier includes the following:

The terminal generates a HARQ codebook for feeding back HARQ feedback information in the $k^{th}$ transmission time unit after the transmission time unit m of the first carrier, where a size of a HARQ codebook of the second carrier that is included in the HARQ codebook is 1/N times a time window size of the second carrier or is equal to a time window size of the first carrier, and the time window size is a quantity of downlink transmission time units for which HARQ feedback information needs to be transmitted in one uplink transmission time unit.

Figure 6:
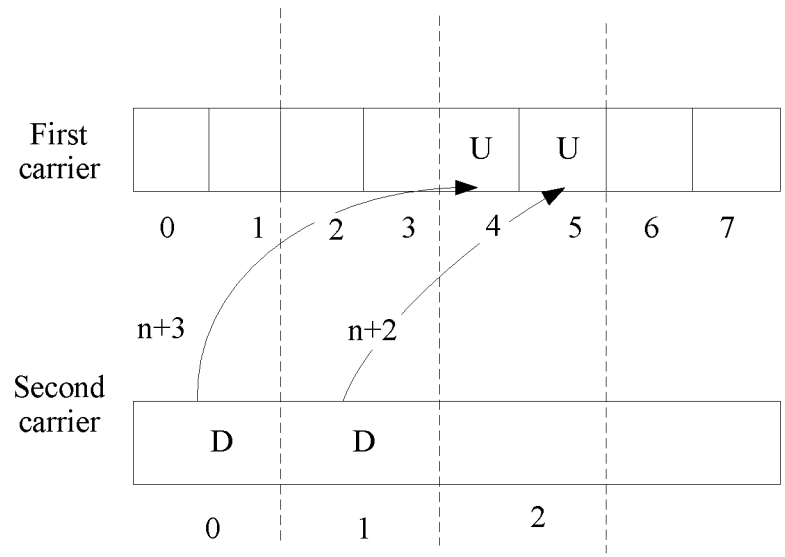
FIG. 6 is a schematic diagram of still another type of HARQ timing according to this application.

In this embodiment of the present invention, as shown in FIG. 6, the transmission time unit length of the second carrier is twice the transmission time unit length of the first carrier. One transmission time unit of the second carrier is aligned with two transmission time units of the first carrier in time domain. A transmission time unit 0 of the second carrier that is aligned with transmission time units 0 and 1 of the first carrier is a downlink transmission time unit, and a transmission time unit 1 of the second carrier that is aligned with transmission time units 2 and 3 of the first carrier is a downlink transmission time unit. HARQ timing of the transmission time unit 0 of the second carrier is used to instruct the terminal to transmit HARQ feedback information for the transmission time unit 0 of the second carrier in a transmission time unit 4 of the first carrier, and HARQ timing of the transmission time unit 1 of the second carrier is used to instruct the terminal to transmit HARQ feedback information for the transmission time unit 1 of the second carrier in a transmission time unit 5 of the first carrier. Because HARQ feedback information for two transmission time units (the transmission time units 0 and 1 of the second carrier) needs to be fed back in the transmission time units 4 and 5 of the first carrier, when the time window size of the second carrier is 2 bits, the size of the HARQ codebook of the second carrier that is included in the HARQ codebook is ½ times the time window size of the second carrier, or in other words, the size of the HARQ codebook of the second carrier is 1 bit. Assuming that data in the transmission time units 0 and 1 of the second carrier is correctly received, both HARQ codebooks of the second carrier in the transmission time units 4 and 5 of the first carrier are 1. A HARQ codebook generation manner of the first carrier is consistent with that in the foregoing embodiment. In addition, the HARQ codebooks of the first carrier are concatenated to obtain a HARQ codebook on the uplink control channel of the first carrier.

Optionally, in some embodiments of the present invention, the relationship between the transmission time unit length of the first carrier and the transmission time unit length of the second carrier is that the transmission time unit length of the second carrier is N times the transmission time unit length of the first carrier. N transmission time units of the first carrier are aligned with one transmission time unit n of the second carrier in time domain, and the N transmission time units of the first carrier include M uplink transmission time units. N is a positive integer greater than 1, n and m are natural numbers, and M≤N.

The HARQ timing of the configured carriers includes HARQ timing of the second carrier, where the HARQ timing of the second carrier is used to instruct the terminal to transmit HARQ feedback information in the transmission time unit n of the second carrier.

That the terminal generates, based on HARQ timing of the configured carriers and a relationship between a transmission time unit length of a first carrier and a transmission time unit length of a second carrier, a HARQ codebook transmitted on an uplink control channel of the first carrier includes the following:

The terminal determines, based on the HARQ timing of the second carrier, to transmit, in one of the M transmission time units of the first carrier, HARQ feedback information that needs to be transmitted in the transmission time unit n of the second carrier; and the terminal generates a HARQ codebook in one of the M transmission time units of the first carrier, where a size of a HARQ codebook of the second carrier that is included in the HARQ codebook is 1/M times a time window size of the second carrier, and the time window size is a quantity of downlink transmission time units for which feedbacks need to be provided in one uplink transmission time unit.

Figure 7:
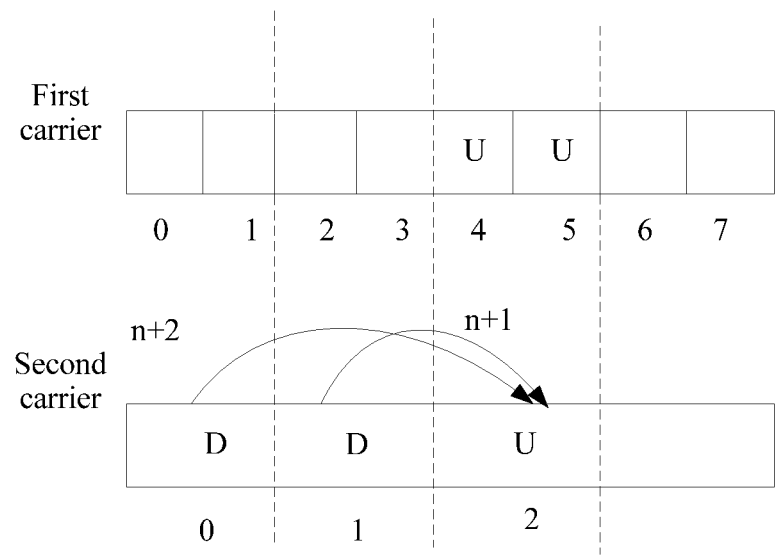
FIG. 7 is a schematic diagram of yet another type of HARQ timing according to this application.

In this embodiment of the present invention, as shown in FIG. 7, the transmission time unit length of the second carrier is twice the transmission time unit length of the first carrier. One transmission time unit of the second carrier is aligned with two transmission time units of the first carrier in time domain. A transmission time unit 0 of the second carrier that is aligned with transmission time units 0 and 1 of the first carrier is a downlink transmission time unit, a transmission time unit 1 of the second carrier that is aligned with transmission time units 2 and 3 of the first carrier is a downlink transmission time unit, and a transmission time unit 2 of the second carrier that is aligned with transmission time units 4 and 5 of the first carrier is an uplink transmission time unit. Both the transmission time units 4 and 5 of the first carrier are uplink transmission time units. HARQ timing of the transmission time unit 0 of the second carrier is used to instruct the terminal to transmit HARQ feedback information for the transmission time unit 0 of the second carrier in the transmission time unit 2 of the second carrier. HARQ timing of the transmission time unit 1 of the second carrier is used to instruct the terminal to transmit HARQ feedback information for the transmission time unit 1 of the second carrier in the transmission time unit 2 of the second carrier. The HARQ feedback information for the transmission time units 0 and 1 needs to be fed back in the transmission time unit 2 of the second carrier. Therefore, the time window size of the second carrier may be 2 bits. The HARQ feedback information in the transmission time unit 2 of the second carrier actually needs to be transmitted in the corresponding transmission time units 4 and 5 of the first carrier. A successive and equal division principle may be used. The HARQ feedback information for the transmission time unit 0 of the second carrier is transmitted in the transmission time unit 4 of the first carrier, and the HARQ feedback information for the transmission time unit 1 of the second carrier is transmitted in the transmission time unit 5 of the first carrier. Therefore, the size of the HARQ codebook of the second carrier that is included in the HARQ codebook is ½ times the time window size of the second carrier, and the size of the HARQ codebook of the second carrier is 1 bit. Assuming that data in the transmission time unit 0 of the second carrier is correctly received, the size of the HARQ codebook of the second carrier is 1. A HARQ codebook generation manner of the first carrier is the same as that in the foregoing embodiment. In addition, the HARQ codebook of the first carrier and the HARQ codebook are concatenated to obtain a HARQ codebook on the uplink control channel of the first carrier, and this is not specifically described.

Alternatively, all feedback information for the transmission time units 0 and 1 of the second carrier may be fed back in the transmission time unit 4 or 5 of the first carrier.

In other words, when one transmission time unit of the second carrier is aligned with N transmission time units of the first carrier, HARQ feedback information is transmitted in the first uplink transmission time unit in the N transmission time units of the first carrier, or transmission directions of the N transmission time units of the first carrier are known in advance by the terminal: There are N1 uplink transmission time units, and the terminal may evenly divide the codebook of the second carrier into N1 parts for feedback in the N1 uplink transmission time units respectively.

It should be understood that, in addition to a quantity of carriers and a time window size, a size of a semi-static codebook is affected by a quantity of code words and a quantity of CBGs (code block group). In the foregoing embodiments, it is assumed that a single code word is transmitted and a CBG feedback mode is not enabled. If at least one two-code-word transmission exists in a time window on a carrier and a hybrid automatic repeat request-acknowledgement bundling (HARQ-ACK bundling) manner is not used, a quantity of feedback bits corresponding to the carrier in the semi-static codebook needs to be further obtained by multiplying a quantity of feedback bits in the foregoing embodiment with 2. When a network device configures CBG-level transmission and a CBG feedback for a terminal device on a carrier by using RRC signaling, and a maximum quantity of CBGs is configured as N, a quantity of HARQ-ACK information bits of the carrier in the semi-static codebook needs to be obtained by multiplying N with the size obtained above. The first M bits in N bits at a location corresponding to each TB are corresponding to HARQ-ACK information of CBGs of the TB, and the last N-M bits may be default NACK.

In addition to the foregoing embodiments, the terminal may further generate a HARQ codebook based on DAI information, and detailed description is specifically as follows:

The access network device determines a value of a total DAI and a value of a cumulative DAI based on a shortest transmission time unit length in at least two transmission time unit lengths;

the access network device sends the value of the total DAI and the value of the cumulative DAI to the terminal, and the terminal receives the value of the total DAI and the value of the cumulative DAI that are sent by the access network device; and the terminal determines a HARQ codebook based on the value of the total DAI and the value of the cumulative DAI.

Optionally, in some embodiments of the present invention, a longest transmission time unit length of a plurality of carriers is N times the shortest transmission time unit length, that is, N shortest transmission time units are aligned with one longest transmission time unit in time domain.

That the access network device determines a value of a total DAI and a value of a cumulative DAI based on a shortest transmission time unit length in at least two transmission time unit lengths includes the following:

On a first carrier in the plurality of carriers, if a header of a first transmission time unit is aligned with a header of one of the N shortest transmission time units in time domain, and the first carrier is scheduled within duration of the first transmission time unit, the first carrier is counted into the total DAI and the cumulative DAI.

In this embodiment of the present invention, as shown in the following Table 1, a specific manner in which the terminal generates the HARQ codebook is as follows:

A transmission time unit length of each of a carrier 0 and a carrier 2 is 0.5 ms, a transmission time unit length of each of a carrier 3 to a carrier 6 is 0.25 ms, and a transmission time unit length of each of a carrier 7 to a carrier 10 is 0.125 ms. Table 1 shows that scheduled carriers that are in the carrier 0 to the carrier 2 and that are aligned with a minimum-length transmission time unit 0 of the carrier 7 to the carrier 10 include the carrier 0 and the carrier 2, scheduled carriers that are in the carrier 3 to the carrier 6 and that are aligned with the minimum-length transmission time unit 0 of the carrier 7 to the carrier 10 include the carrier 4 and the carrier 6, and a scheduled carrier that are in the carrier 7 to the carrier 10 and that are aligned with the minimum-length transmission time unit 0 of the carrier 7 to the carrier 10 includes the carrier 8. Scheduled carriers that are in the carrier 7 to the carrier 10 and that are aligned with a minimum-length transmission time unit 1 of the carrier 7 to the carrier 10 include the carrier 7 and the carrier 9. A scheduled carrier that is in the carrier 3 to the carrier 6 and that is aligned with a minimum-length transmission time unit 2 of the carrier 7 to the carrier 10 includes the carrier 3. Scheduled carriers that are in the carrier 7 to the carrier 10 and that are aligned with the minimum-length transmission time unit 2 of the carrier 7 to the carrier 10 include the carrier 8 and the carrier 10. Scheduled carriers that are in the carrier 7 to the carrier 10 and that are aligned with a minimum-length transmission time unit 4 of the carrier 7 to the carrier 10 include the carrier 8 and the carrier 9. According to information about the scheduled carriers in Table 1 that are configured by the access network device, the access network device may use a minimum transmission time unit 0.125 ms as a statistical unit. In the first 0.125 ms transmission time unit, five carriers are scheduled in total in other subframes aligned with the subframe. In this case, a value of a total DAI of the five scheduled carriers is 5, a value of a cumulative DAI is 1, 2, 3, 4, or 5, and calculation is performed in ascending order of carrier numbers. In the second 0.125 ms transmission time unit, only two carriers are scheduled in other transmission time units aligned with a header of the transmission time unit, the value of the total DAI is 7, and the value of the cumulative DAI is 6 or 7. In the third 0.125 ms transmission time unit, only three carriers are scheduled in other transmission time units aligned with a header of the transmission time unit, the value of the total DAI is 10, and the value of the cumulative DAI is 8, 9, or 10. In the fourth 0.125 ms transmission time unit, only two carriers are scheduled in other transmission time units aligned with a header of the transmission time unit, the value of the total DAI is 12, and the value of the cumulative DAI is 11 or 12. A size of an obtained HARQ codebook is 12 bits, and the HARQ codebook may be obtained based on a data receiving status in a transmission time unit of each scheduled carrier.

TABLE 1

| Carrier/ transmission time unit | Length (0.125 ms) | Length (0.125 ms) | Length (0.125 ms) | Length (0.125 ms) |
|---|---|---|---|---|
| Carrier 0 | | | D (5, 1) | |
| Carrier 1 | | | | |
| Carrier 2 | | | D (5, 2) | |

TABLE 1-continued

| Carrier/ transmission time unit | Length (0.125 ms) | Length (0.125 ms) | Length (0.125 ms) | Length (0.125 ms) |
|---|---|---|---|---|
| Carrier 3 | | | D (10, 8) | |
| Carrier 4 | D (5, 3) | | | |
| Carrier 5 | | | | |
| Carrier 6 | D (5, 4) | | | |
| Carrier 7 | | D (7, 6) | | |
| Carrier 8 | D (5, 5) | | D (10, 9) | D (12, 11) |
| Carrier 9 | | D (7, 7) | | D (12, 12) |
| Carrier 10 | | | D (10, 10) | |
| | 0 | 1 | 2 | 3 |

In the foregoing embodiments, the HARQ codebook generation method in the present invention is described. The following describes the access network device and the terminal in detail by using embodiments.

Figure 8:
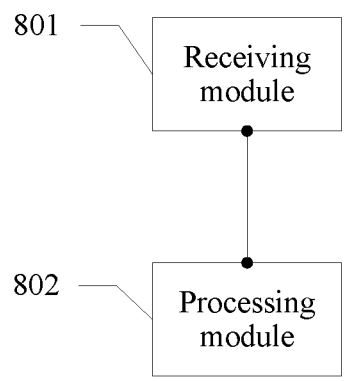
FIG. 8 is a schematic structural diagram of an embodiment of a terminal according to this application.

Referring to FIG. 8, the present invention provides a terminal, including:

a receiving module 801, configured to receive first information sent by an access network device, where the first information is used to indicate, to the terminal, carriers configured by the access network device for the terminal, the configured carriers include a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier; and a processing module 802, configured to generate, based on HARQ timing of the configured carriers and a relationship between the transmission time unit length of the first carrier and the transmission time unit length of the second carrier, a HARQ codebook transmitted on the uplink control channel of the first carrier.

Optionally, in some embodiments of the present invention, the relationship between the transmission time unit length of the first carrier and the transmission time unit length of the second carrier is that the transmission time unit length of the first carrier is N times the transmission time unit length of the second carrier. One transmission time unit n of the first carrier is aligned with N transmission time units of the second carrier in time domain, and the N transmission time units of the second carrier include a transmission time unit m. N is a positive integer greater than 1, and n and m are natural numbers.

The HARQ timing of the configured carriers includes HARQ timing of the transmission time unit m of the second carrier, where the HARQ timing of the transmission time unit m is used to instruct the terminal to transmit HARQ feedback information for the transmission time unit m in a $k^{th}$ transmission time unit after the transmission time unit n of the first carrier.

The processing module 802 is specifically configured to generate a HARQ codebook transmitted in the $k^{th}$ transmission time unit after the transmission time unit n of the first carrier, where a size of a HARQ codebook of the second carrier that is included in the HARQ codebook is N times a time window size of the second carrier, and the time window size is a quantity of downlink transmission time units for which HARQ feedback information needs to be transmitted in one uplink transmission time unit.

Optionally, in some embodiments of the present invention, the relationship between the transmission time unit length of the first carrier and the transmission time unit length of the second carrier is that the transmission time unit length of the first carrier is N times the transmission time unit length of the second carrier. One transmission time unit n of the first carrier is aligned with N time units of the second carrier in time domain, N is a positive integer greater than 1, and n is a natural number.

The HARQ timing of the configured carriers includes HARQ timing of the second carrier, where the HARQ timing of the second carrier is used to instruct the terminal to transmit HARQ feedback information in at least one of the N transmission time units of the second carrier.

The processing module 802 is specifically configured to determine, based on the HARQ timing of the second carrier, to transmit, in the transmission time unit n of the first carrier, HARQ feedback information that needs to be transmitted in at least one of the N transmission time units; and the processing module 802 is further configured to generate a HARQ codebook transmitted in the transmission time unit n of the first carrier, where a size of a HARQ codebook of the second carrier that is included in the HARQ codebook is N times a time window size of the second carrier, and the time window size is a quantity of downlink transmission time units for which HARQ feedback information needs to be transmitted in one uplink transmission time unit.

Optionally, in some embodiments of the present invention, the relationship between the transmission time unit length of the first carrier and the transmission time unit length of the second carrier is that the transmission time unit length of the first carrier is N times the transmission time unit length of the second carrier. One transmission time unit n of the first carrier is aligned with N transmission time units of the second carrier in time domain, and the N transmission time units of the second carrier include M uplink transmission time units. N is a positive integer greater than 1, M is a positive integer, n is a natural number, and M≤N.

The HARQ timing of the configured carriers includes HARQ timing of the second carrier, where the HARQ timing of the second carrier is used to instruct the terminal to transmit HARQ feedback information in at least one of the M uplink transmission time units of the second carrier.

The processing module 802 is specifically configured to determine, based on the HARQ timing of the second carrier, to transmit, in the transmission time unit n of the first carrier, HARQ feedback information that needs to be transmitted in at least one of the M transmission time units; and the processing module 802 is further configured to generate a HARQ codebook transmitted in the transmission time unit n of the first carrier, where a size of a HARQ codebook of the second carrier that is included in the HARQ codebook is M times a time window size of the second carrier, and the time window size is a quantity of downlink transmission time units for which HARQ feedback information needs to be transmitted in one uplink transmission time unit.

Optionally, in some embodiments of the present invention, the relationship between the transmission time unit length of the first carrier and the transmission time unit length of the second carrier is that the transmission time unit length of the second carrier is N times the transmission time unit length of the first carrier. N transmission time units of the first carrier are aligned with one transmission time unit n of the second carrier in time domain, and the last transmission time unit of the N transmission time units of the first carrier in time domain is a transmission time unit m. N is a positive integer greater than 1, and n and m are natural numbers.

The HARQ timing of the configured carriers includes HARQ timing of the transmission time unit n of the second carrier, where the HARQ timing of the transmission time unit n is used to instruct the terminal to transmit HARQ feedback information for the transmission time unit n in a $k^{th}$ transmission time unit after the transmission time unit m of the first carrier.

The processing module 802 is specifically configured to generate a HARQ codebook for feeding back HARQ feedback information in the $k^{th}$ transmission time unit after the transmission time unit of the first carrier, where a size of a HARQ codebook of the second carrier that is included in the HARQ codebook is 1/N times a time window size of the second carrier or is equal to a time window size of the first carrier, and the time window size is a quantity of downlink transmission time units for which HARQ feedback information needs to be transmitted in one uplink transmission time unit.

Optionally, in some embodiments of the present invention, the relationship between the transmission time unit length of the first carrier and the transmission time unit length of the second carrier is that the transmission time unit length of the second carrier is N times the transmission time unit length of the first carrier. N transmission time units of the first carrier are aligned with one transmission time unit n of the second carrier in time domain, and the N transmission time units of the first carrier include M uplink transmission time units. N is a positive integer greater than 1, n and m are natural numbers, and M≤N.

The HARQ timing of the configured carriers includes HARQ timing of the second carrier, where the HARQ timing of the second carrier is used to instruct the terminal to transmit HARQ feedback information in the transmission time unit n of the second carrier.

The processing module 802 is specifically configured to determine, based on the HARQ timing of the second carrier, to transmit, in one of the M transmission time units of the first carrier, HARQ feedback information that needs to be transmitted in the transmission time unit n of the second carrier; and the processing module 802 is further configured to generate a HARQ codebook in one of the M transmission time units of the first carrier, where a size of a HARQ codebook of the second carrier that is included in the HARQ codebook is 1/M times a time window size of the second carrier, and the time window size is a quantity of downlink transmission time units for which feedbacks need to be provided in one uplink transmission time unit.

Optionally, in some embodiments of the present invention, the first carrier is a primary carrier, and the second carrier is a secondary carrier.

Figure 9:
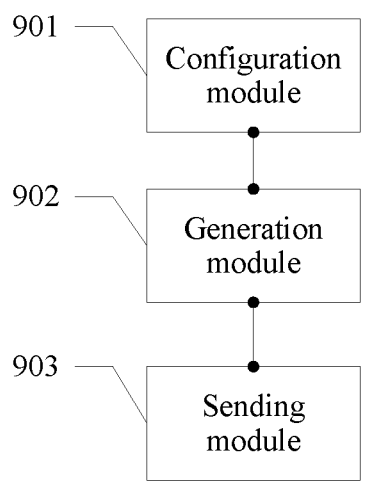
FIG. 9 is a schematic structural diagram of an embodiment of an access network device according to this application.

Referring to FIG. 9, the present invention provides an access network device, including:

a configuration module 901, configured to assign configured carriers to a terminal;

a generation module 902, configured to generate first information based on the assignment, where the first information is used to indicate, to the terminal, the carriers configured by the access network device for the terminal, the configured carriers include a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier; and a sending module 903, configured to send the first information to the terminal.

Optionally, in some embodiments of the present invention, that the transmission time unit length of the first carrier is not equal to the transmission time unit length of the second carrier includes that carrier information includes that the transmission time unit length of the first carrier is N times the transmission time unit length of the second carrier; one transmission time unit n of the first carrier is aligned with N transmission time units of the second carrier in time domain; and N is a positive integer greater than 1, and n is a natural number.

Optionally, in some embodiments of the present invention, the N transmission time units of the second carrier include M uplink transmission time units, and M≤N.

Optionally, in some embodiments of the present invention, that the transmission time unit length of the first carrier is not equal to the transmission time unit length of the second carrier includes that carrier information includes that the transmission time unit length of the second carrier is N times the transmission time unit length of the first carrier; N transmission time units of the first carrier are aligned with one transmission time unit n of the second carrier in time domain; and N is a positive integer greater than 1, and n is a natural number.

Optionally, in some embodiments of the present invention, the N transmission time units of the first carrier include M uplink transmission time units, and M≤N.

Optionally, in some embodiments of the present invention, the first message is further used to indicate a relationship between the transmission time unit length of the first carrier and the transmission time unit length of the second carrier.

Optionally, in some embodiments of the present invention, the N transmission time units of the second carrier include a transmission time unit m, and m is a natural number;

the configuration module 901 is further configured to configure HARQ timing of the transmission time unit m of the second carrier for the terminal, where the HARQ timing of the transmission time unit m is used to instruct the terminal to transmit HARQ feedback information for the transmission time unit m in a $k^{th}$ transmission time unit after the transmission time unit n of the first carrier; and the first information is further used to indicate the HARQ timing of the transmission time unit m of the second carrier.

Optionally, in some embodiments of the present invention, the last transmission time unit in the N transmission time units of the first carrier in time domain is a transmission time unit m, and m is a natural number;

the configuration module 901 is further configured to configure HARQ timing of the transmission time unit n of the second carrier for the terminal, where the HARQ timing of the transmission time unit n is used to instruct the terminal to transmit HARQ feedback information for the transmission time unit n in a $k^{th}$ transmission time unit after the transmission time unit m of the first carrier; and the first information is further used to indicate the HARQ timing of the transmission time unit n of the second carrier.

In conclusion, when the terminal accesses the access network device, the configuration module 901 of the access network device configures the carriers for the terminal. The configured carriers include the first carrier and the second carrier, the HARQ feedback information of the first carrier and the HARQ feedback information of the second carrier are transmitted on the uplink control channel of the first carrier, and the transmission time unit length of the first carrier is not equal to the transmission time unit length of the second carrier. In addition, the generation module 902 obtains the first information, and the terminal is notified of the first information by using the sending module 903. The receiving module 801 of the terminal receives the first information sent by the sending module 903. The processing module 802 of the terminal generates, based on the HARQ timing of the carriers configured by the access network device and the relationship between the transmission time unit length of the first carrier and the transmission time unit length of the second carrier, the HARQ codebook transmitted on the uplink control channel of the first carrier. In the prior art, because a transmission time unit length of a first carrier is not equal to a transmission time unit length of a second carrier, a HARQ codebook generated by a terminal is incorrect. In this embodiment of the present invention, the terminal can correctly generate the HARQ codebook, and data transmission between the access network device and the terminal is not affected.

Figure 10:
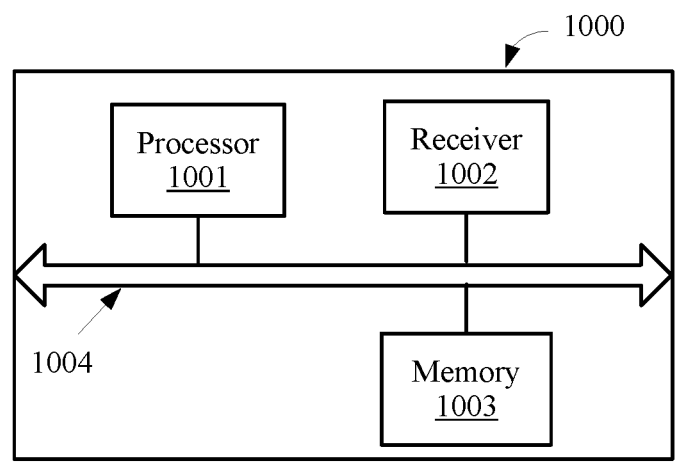
FIG. 10 is a schematic structural diagram of another embodiment of a terminal according to this application.

Referring to FIG. 10, an embodiment of the present invention provides a terminal 1000, including:

The terminal 1000 may include a processor 1001, a receiver 1002, and a memory 1003, where the memory 1003 may be configured to store code executed by the processor 1001.

Components of the terminal 1000 are coupled together by using a bus system 1004. In addition to a data bus, the bus system 1004 includes a power bus, a control bus, and a status signal bus.

The receiver 1002 is configured to receive first information sent by an access network device, where the first information is used to indicate, to the terminal, carriers configured by the access network device for the terminal, the configured carriers include a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier; and the processor 1001 is configured to generate, based on HARQ timing of the configured carriers and a relationship between the transmission time unit length of the first carrier and the transmission time unit length of the second carrier, a HARQ codebook transmitted on the uplink control channel of the first carrier.

Figure 11:
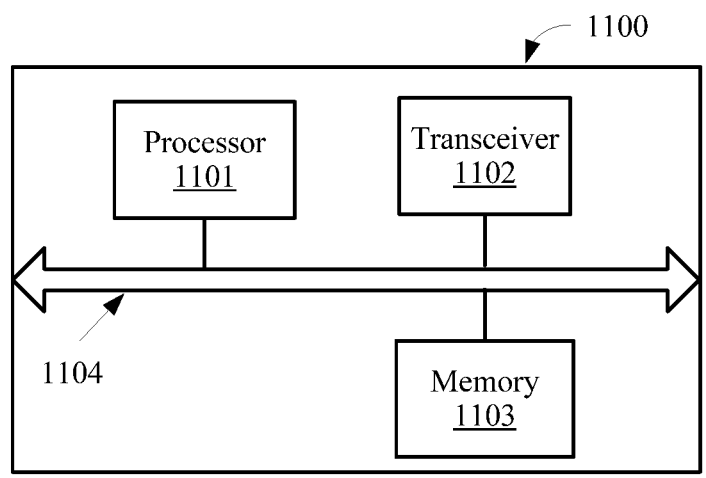
FIG. 11 is a schematic structural diagram of another embodiment of an access network device according to this application.

Referring to FIG. 11, an embodiment of the present invention provides an access network device 1100, including:

The access network device 1100 may include a processor 1101, a transceiver 1102, and a memory 1103, where the memory 1103 may be configured to store code executed by the processor 1101.

Components of the access network device 1100 are coupled together by using a bus system 1104. In addition to a data bus, the bus system 1104 includes a power bus, a control bus, and a status signal bus.

The processor 1101 is configured to assign configured carriers to a terminal;

the processor 1101 is further configured to generate first information based on the assignment, where the configured carriers include a first carrier and a second carrier, HARQ feedback information of the first carrier and HARQ feedback information of the second carrier are fed back on an uplink control channel of the first carrier, and a transmission time unit length of the first carrier is not equal to a transmission time unit length of the second carrier; and the transceiver 1102 is configured to send the first information to the terminal.

In this embodiment of the present invention, when the terminal accesses the access network device, the processor 1101 of the access network device 1100 configures the carriers for the terminal. The configured carriers include the first carrier and the second carrier. The HARQ feedback information of the first carrier and the HARQ feedback information of the second carrier are transmitted on the uplink control channel of the first carrier. The transmission time unit length of the first carrier is not equal to the transmission time unit length of the second carrier. In addition, the first information is obtained. The transceiver 1102 notifies the terminal of the first information, and the receiver 1002 of the terminal 1000 receives the first information sent by the access network device 1100. The processor 1001 generates, based on the HARQ timing of the carriers configured by the access network device and the relationship between the transmission time unit length of the first carrier and the transmission time unit length of the second carrier, the HARQ codebook transmitted on the uplink control channel of the first carrier. In the prior art, because a transmission time unit length of a first carrier is not equal to a transmission time unit length of a second carrier, a HARQ codebook generated by a terminal is incorrect. In this embodiment of the present invention, the terminal can correctly generate the HARQ codebook, and data transmission between the access network device and the terminal is not affected.

It should be noted that the foregoing method embodiment of the present invention may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another proper type.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

In conclusion, the foregoing embodiments are merely intended for describing the technical solutions of the present invention, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A hybrid automatic repeat request (HARQ) codebook generation method, comprising:
  receiving, by a terminal, first information sent by an access network device, wherein the first information is used to indicate, to the terminal, carriers configured by the access network device for the terminal, the configured carriers comprise a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier, wherein:
    the transmission time unit length of the first carrier is N times the transmission time unit length of the second carrier, and one transmission time unit n of the first carrier is aligned with N transmission time units of the second carrier in a time domain; or
    the transmission time unit length of the second carrier is N times the transmission time unit length of the first carrier, and N transmission time units of the first carrier are aligned with one transmission time unit n of the second carrier in the time domain; and
  generating, by the terminal based on HARQ timing of the configured carriers and a relationship between the transmission time unit length of the first carrier and the transmission time unit length of the second carrier, a HARQ codebook transmitted on the uplink control channel of the first carrier,
  wherein N is a positive integer greater than 1, and n is a natural number.

2. The method according to claim 1, wherein the relationship between the transmission time unit length of the first carrier and the transmission time unit length of the second carrier is that the transmission time unit length of the first carrier is N times the transmission time unit length of the second carrier, and one transmission time unit n of the first carrier is aligned with N transmission time units of the second carrier in the time domain, wherein the N transmission time units of the second carrier comprise a transmission time unit m; and m is a natural number;
  the HARQ timing of the configured carriers comprises HARQ timing of the transmission time unit m of the second carrier, wherein the HARQ timing of the transmission time unit m is used to instruct the terminal to transmit HARQ feedback information for the transmission time unit m in a $k^{th}$ transmission time unit after the transmission time unit n of the first carrier; and
  the generating, by the terminal based on HARQ timing of the configured carriers and a relationship between the transmission time unit length of the first carrier and the transmission time unit length of the second carrier, a HARQ codebook transmitted on the uplink control channel of the first carrier comprises:
  generating, by the terminal, a HARQ codebook transmitted in the $k^{th}$ transmission time unit after the transmission time unit n of the first carrier, wherein a size of a HARQ codebook of the second carrier that is comprised in the HARQ codebook is N times a time window size of the second carrier, and the time window size is a quantity of downlink transmission time units for which HARQ feedback information needs to be transmitted in one uplink transmission time unit.

3. The method according to claim 1, wherein the relationship between the transmission time unit length of the first carrier and the transmission time unit length of the second carrier is that the transmission time unit length of the first carrier is N times the transmission time unit length of the second carrier, and one transmission time unit n of the first carrier is aligned with N transmission time units of the second carrier in the time domain;
  the HARQ timing of the configured carriers comprises HARQ timing of the second carrier, wherein the HARQ timing of the second carrier is used to instruct the terminal to transmit HARQ feedback information in at least one of the N transmission time units of the second carrier; and
  the generating, by the terminal based on HARQ timing of the configured carriers and a relationship between the transmission time unit length of the first carrier and the transmission time unit length of the second carrier, a HARQ codebook transmitted on the uplink control channel of the first carrier comprises:
  determining, by the terminal based on the HARQ timing of the second carrier, to transmit, in the transmission time unit n of the first carrier, HARQ feedback information that needs to be transmitted in at least one of the N transmission time units; and
  generating, by the terminal, a HARQ codebook transmitted in the transmission time unit n of the first carrier, wherein a size of a HARQ codebook of the second carrier that is comprised in the HARQ codebook is N times a time window size of the second carrier, and the time window size is a quantity of downlink transmission time units for which HARQ feedback information needs to be transmitted in one uplink transmission time unit.

4. The method according to claim 1, wherein the relationship between the transmission time unit length of the first carrier and the transmission time unit length of the second carrier is that the transmission time unit length of the second carrier is N times the transmission time unit length of the first carrier, and N transmission time units of the first carrier are aligned with one transmission time unit n of the second carrier in the time domain, wherein a last transmission time unit of the N transmission time units of the first carrier in the time domain is a transmission time unit m; and m is a natural number;

the HARQ timing of the configured carriers comprises HARQ timing of the transmission time unit n of the second carrier, wherein the HARQ timing of the transmission time unit n is used to instruct the terminal to transmit HARQ feedback information for the transmission time unit n in a $k^{th}$ transmission time unit after the transmission time unit m of the first carrier; and the generating, by the terminal based on HARQ timing of the configured carriers and a relationship between the transmission time unit length of the first carrier and the transmission time unit length of the second carrier, a HARQ codebook transmitted on the uplink control channel of the first carrier comprises:

generating, by the terminal, a HARQ codebook for feeding back HARQ feedback information in the $k^{th}$ transmission time unit after the transmission time unit m of the first carrier, wherein a size of a HARQ codebook of the second carrier that is comprised in the HARQ codebook is 1/N times a time window size of the second carrier or is equal to a time window size of the first carrier, and the time window size is a quantity of downlink transmission time units for which HARQ feedback information needs to be transmitted in one uplink transmission time unit.

5. The method according to claim 1, wherein the first carrier is a primary carrier, and the second carrier is a secondary carrier.

6. A hybrid automatic repeat request (HARQ) codebook generation method, comprising:

assigning, by an access network device, configured carriers to a terminal;

generating, by the access network device, first information based on the assignment, wherein the first information is used to indicate, to the terminal, the carriers configured by the access network device for the terminal, the configured carriers comprise a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier wherein:

the transmission time unit length of the first carrier is N times the transmission time unit length of the second carrier and one transmission time unit n of the first carrier is aligned with N transmission time units of the second carrier in a time domain; or the transmission time unit length of the second carrier is N times the transmission time unit length of the first carrier; N transmission time units of the first carrier are aligned with one transmission time unit n of the second carrier in the time domain; and sending, by the access network device, the first information to the terminal, wherein N is a positive integer greater than 1, and n is a natural number.

7. The method according to claim 6, wherein the transmission time unit length of the first carrier is N times the transmission time unit length of the second carrier and one transmission time unit n of the first carrier is aligned with N transmission time units of the second carrier in the time domain, and wherein the N transmission time units of the second carrier comprise a transmission time unit m, and m is a natural number; and the method further comprises:

configuring, by the access network device, HARQ timing of the transmission time unit m of the second carrier for the terminal, wherein the HARQ timing of the transmission time unit m is used to instruct the terminal to transmit HARQ feedback information for the transmission time unit m in a $k^{th}$ transmission time unit after the transmission time unit n of the first carrier; and the first information is further used to indicate the HARQ timing of the transmission time unit m of the second carrier.

8. The method according to claim 6, wherein the transmission time unit length of the second carrier is N times the transmission time unit length of the first carrier; N transmission time units of the first carrier are aligned with one transmission time unit n of the second carrier in the time domain, and wherein the last transmission time unit in the N transmission time units of the first carrier in the time domain is a transmission time unit m, and m is a natural number; and the method further comprises:

configuring, by the access network device, HARQ timing of the transmission time unit n of the second carrier for the terminal, wherein the HARQ timing of the transmission time unit n is used to instruct the terminal to transmit HARQ feedback information for the transmission time unit n in a $k^{th}$ transmission time unit after the transmission time unit m of the first carrier; and the first information is further used to indicate the HARQ timing of the transmission time unit n of the second carrier.

9. A terminal, comprising:

a memory storing instructions; and a processor coupled to the memory to execute the instructions to:

receive first information sent by an access network device, wherein the first information is used to indicate, to the terminal, carriers configured by the access network device for the terminal, the configured carriers comprise a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier, wherein:

the transmission time unit length of the first carrier is N times the transmission time unit length of the second carrier, and one transmission time unit n of the first carrier is aligned with N transmission time units of the second carrier in a time domain; or the transmission time unit length of the second carrier is N times the transmission time unit length of the first carrier, and N transmission time units of the first carrier are aligned with one transmission time unit n of the second carrier in the time domain; and generate, based on HARQ timing of the configured carriers and a relationship between the transmission time unit length of the first carrier and the transmission time unit length of the second carrier, a HARQ codebook transmitted on the uplink control channel of the first carrier, wherein N is a positive integer greater than 1, and n is a natural number.

10. The terminal according to claim 9, wherein the relationship between the transmission time unit length of the first carrier and the transmission time unit length of the second carrier is that the transmission time unit length of the first carrier is N times the transmission time unit length of the second carrier, and one transmission time unit n of the first carrier is aligned with N transmission time units of the second carrier in the time domain, wherein the N transmission time units of the second carrier comprise a transmission time unit m; and m is a natural number;

the HARQ timing of the configured carriers comprises HARQ timing of the transmission time unit m of the second carrier, wherein the HARQ timing of the transmission time unit m is used to instruct the terminal to transmit HARQ feedback information for the transmission time unit m in a $k^{th}$ transmission time unit after the transmission time unit n of the first carrier; and the generate step comprises generate a HARQ codebook transmitted in the $k^{th}$ transmission time unit after the transmission time unit n of the first carrier, wherein a size of a HARQ codebook of the second carrier that is comprised in the HARQ codebook is N times a time window size of the second carrier, and the time window size is a quantity of downlink transmission time units for which HARQ feedback information needs to be transmitted in one uplink transmission time unit.

11. The terminal according to claim 9, wherein the relationship between the transmission time unit length of the first carrier and the transmission time unit length of the second carrier is that the transmission time unit length of the first carrier is N times the transmission time unit length of the second carrier, and one transmission time unit n of the first carrier is aligned with N transmission time units of the second carrier in the time domain;

the HARQ timing of the configured carriers comprises HARQ timing of the second carrier, wherein the HARQ timing of the second carrier is used to instruct the terminal to transmit HARQ feedback information in at least one of the N transmission time units of the second carrier;

the generate step comprises determine, based on the HARQ timing of the second carrier, to transmit, in the transmission time unit n of the first carrier, HARQ feedback information that needs to be transmitted in at least one of the N transmission time units; and generate a HARQ codebook transmitted in the transmission time unit n of the first carrier, wherein a size of a HARQ codebook of the second carrier that is comprised in the HARQ codebook is N times a time window size of the second carrier, and the time window size is a quantity of downlink transmission time units for which HARQ feedback information needs to be transmitted in one uplink transmission time unit.

12. The terminal according to claim 9, wherein the relationship between the transmission time unit length of the first carrier and the transmission time unit length of the second carrier is that the transmission time unit length of the second carrier is N times the transmission time unit length of the first carrier, and N transmission time units of the first carrier are aligned with one transmission time unit n of the second carrier in time domain, wherein the last transmission time unit of the N transmission time units of the first carrier in the time domain is a transmission time unit m; and m is a natural number;

the HARQ timing of the configured carriers comprises HARQ timing of the transmission time unit n of the second carrier, wherein the HARQ timing of the transmission time unit n is used to instruct the terminal to transmit HARQ feedback information for the transmission time unit n in a $k^{th}$ transmission time unit after the transmission time unit m of the first carrier; and the generate step comprises generate a HARQ codebook for feeding back HARQ feedback information in the $k^{th}$ transmission time unit after the transmission time unit m of the first carrier, wherein a size of a HARQ codebook of the second carrier that is comprised in the HARQ codebook is 1/N times a time window size of the second carrier or is equal to a time window size of the first carrier, and the time window size is a quantity of downlink transmission time units for which HARQ feedback information needs to be transmitted in one uplink transmission time unit.

13. The terminal according to claim 9, wherein the first carrier is a primary carrier, and the second carrier is a secondary carrier.

14. An access network device, comprising:
a memory storing instructions; and
a processor coupled to the memory to execute the instructions to:
assign configured carriers to a terminal;
generate first information based on the assignment, wherein the first information is used to indicate, to the terminal, the carriers configured by the access network device for the terminal, the configured carriers comprise a first carrier and a second carrier, HARQ feedback information of the first carrier and HARQ feedback information of the second carrier are transmitted on an uplink control channel of the first carrier, and a transmission time unit length of the first carrier is not equal to a transmission time unit length of the second carrier, wherein:
the transmission time unit length of the first carrier is N times the transmission time unit length of the second carrier and one transmission time unit n of the first carrier is aligned with N transmission time units of the second carrier in a time domain; or
the transmission time unit length of the second carrier is N times the transmission time unit length of the first carrier and N transmission time units of the first carrier are aligned with one transmission time unit n of the second carrier in the time domain; and
send the first information to the terminal,
wherein N is a positive integer greater than 1, and n is a natural number.

15. The access network device according to claim 14, wherein the transmission time unit length of the first carrier is N times the transmission time unit length of the second carrier and one transmission time unit n of the first carrier is aligned with N transmission time units of the second carrier in the time domain, and wherein the N transmission time units of the second carrier comprise an uplink transmission time unit m, and m is a natural number;

the processor coupled to the memory to further execute the instructions to: configure HARQ timing of the transmission time unit m of the second carrier for the terminal, wherein the HARQ timing of the transmission time unit m is used to instruct the terminal to transmit HARQ feedback information for the transmission time unit m in a $k^{th}$ transmission time unit after the transmission time unit n of the first carrier; and the first information is further used to indicate the HARQ timing of the transmission time unit m of the second carrier.

16. The access network device according to claim 14, wherein the transmission time unit length of the second carrier is N times the transmission time unit length of the first carrier; N transmission time units of the first carrier are aligned with one transmission time unit n of the second carrier in the time domain, and wherein the last transmission time unit in the N transmission time units of the first carrier in the time domain is a transmission time unit m, and m is a natural number;
    the processor coupled to the memory to further execute the instructions to: configure HARQ timing of the transmission time unit n of the second carrier for the terminal, wherein the HARQ timing of the transmission time unit n is used to instruct the terminal to transmit HARQ feedback information for the transmission time unit n in a $k^{th}$ transmission time unit after the transmission time unit m of the first carrier; and
    the first information is further used to indicate the HARQ timing of the transmission time unit n of the second carrier.

\* \* \* \* \*